(12) United States Patent
Matsuda

(10) Patent No.: US 7,598,992 B2
(45) Date of Patent: Oct. 6, 2009

(54) IMAGING APPARATUS HAVING PIXEL SENSOR

(75) Inventor: Seisuke Matsuda, Hachioji (JP)

(73) Assignee: Olympus Corporation, Tokyo (JP)

( * ) Notice: Subject to any disclaimer, the term of this patent is extended or adjusted under 35 U.S.C. 154(b) by 767 days.

(21) Appl. No.: 11/166,190

(22) Filed: Jun. 27, 2005

(65) Prior Publication Data
US 2005/0285958 A1 Dec. 29, 2005

(30) Foreign Application Priority Data
Jun. 29, 2004 (JP) ............................. 2004-190627

(51) Int. Cl.
*H04N 3/14* (2006.01)
*H04N 5/335* (2006.01)
(52) U.S. Cl. .................. 348/294; 348/241; 348/308; 348/302; 348/222.1; 250/208.1
(58) Field of Classification Search ................ 348/241
See application file for complete search history.

(56) References Cited
U.S. PATENT DOCUMENTS
6,177,293 B1 * 1/2001 Netzer et al. ................... 438/73
2004/0095494 A1 * 5/2004 Mentzer et al. ............. 348/308
2008/0079825 A1 * 4/2008 Matsuda ..................... 348/241

FOREIGN PATENT DOCUMENTS
JP 2002-330349 A 11/2002

* cited by examiner

*Primary Examiner*—Tuan V Ho
*Assistant Examiner*—Cynthia Calderon
(74) *Attorney, Agent, or Firm*—Westerman, Hattori, Daniels & Adrian, LLP

(57) ABSTRACT

Disclosed herein is a solid-state imaging apparatus including: a pixel section having unit pixels disposed two-dimensionally in rows and columns, each pixel containing a photoelectric conversion section and an amplifying section for amplifying output of the photoelectric conversion section to output a pixel signal; a vertical scanning section for selecting a row to be read out of the pixel section; a noise suppressing section having a noise suppressing function where a noise suppression of the pixel signal is effected unit pixel by unit pixel and a signal mixing function where a plurality of the pixel signal are mixed along a predetermined direction; a horizontal scanning section for causing the pixel signals along a horizontal direction processed through the noise suppressing section to be sequentially outputted from a horizontal signal line; and a mode control section for effecting a control in accordance with each mode of a first mode where pixel signals after the noise suppression are outputted onto the horizontal signal line and a second mode where pixel signals after a parallel processing combining the noise suppression and the signal mixing are outputted onto the horizontal signal line.

7 Claims, 12 Drawing Sheets

IMAGING APPARATUS HAVING PIXEL SENSOR

This application claims benefit of Japanese Patent Application No. 2004-190627 filed in Japan on Jun. 29, 2004, the contents of which are incorporated by this reference.

BACKGROUND OF THE INVENTION

The present invention relates to solid-state imaging apparatus, and more particularly relates to solid-state imaging apparatus using an amplified MOS sensor.

In recent years, solid-state imaging apparatus using an amplifier type MOS sensor as the solid-state imaging device are used as power-saving type solid-state imaging apparatus for mobile equipment and are also mounted on high-resolution electronic still cameras. While a progressive scanning where pixel signals are read out in a well regulated sequence is generally used in the current solid-state imaging apparatus using an amplified MOS sensor, it is also required to rapidly read pixel signals of relatively low resolution for example as a small image frame for use in a viewfinder or monitor in those solid-state imaging apparatus to be mounted on the electronic still cameras. For this reason, there has been proposed a processing method where pixel signals in a horizontal or vertical direction are mixed within the solid-state imaging apparatus to reduce the number of image data.

FIG. 1 is a circuit diagram showing construction of a previously proposed solid-state imaging apparatus as disclosed in Japanese Patent Application Laid-Open 2002-330349 where an example is shown of solid-state imaging apparatus having a means for mixing pixel signals in a horizontal direction. The solid-state imaging apparatus includes: a pixel section 1 where unit pixels P11 to P44 are disposed two-dimensionally in rows and columns, here in a 4×4 pixel array; a vertical scanning circuit 2 for selecting a row to be read out of the pixel section 1; a current supplying section 3 for supplying bias current to the pixel section 1; a noise suppressing section 4 for suppressing noise components contained in the output signals of the pixel section 1; a horizontal select switch section 5 for outputting noise-suppressed signals; a horizontal scanning circuit 6 for selecting a column to be read out of the horizontal select switch section 5; and an output line 7.

The unit pixels P11 to P44 each include: a photodiode PD1 serving as a photoelectric conversion section; a reset transistor M1 for resetting detection signal of photodiode PD1; an amplifying transistor M2 for amplifying signals of the photodiode PD1; and a row select transistor M3 for selecting the unit pixels in each row.

A row to be read out of the pixel section 1 is then selected by means of power and signals to be applied on a power supply line VR1 to VR4, row reset line ϕRST1 to ϕRST4, and row select line ϕROW1 to ϕROW4 that are the outputs of the vertical scanning circuit 2, thereby the pixel signals of the unit pixels P11 to P44 are read out row by row.

At the noise suppressing section 4, a noise suppressing circuit CDS1 to CDS4 consisting of a sampling transistor M21 to M24, holding capacitor C21 to C24, input buffer amplifier A21 to A24, clamping transistor M31 to M34, clamping capacitor C31 to C34, and output buffer amplifier A31 to A34 is respectively provided for each column. The noise suppressing section 4 is constructed by further providing horizontal mixing transistors M41 and M43 to be controlled by horizontal mixing control line ϕAV–H to which clamp output lines CL11, CL12 and CL13, CL14 are respectively connected.

At each noise suppressing circuit CDS1 to CDS4, the drain of sampling transistor M21 to M24 is connected to respective vertical signal line V11 to V14, the source thereof to one end of the holding capacitor C21 to C24 and to an input end of the input buffer amplifier A21 to A24, and the gate thereof is connected in common to a sampling control line ϕSH. The output end of the input buffer amplifier A21 to A24 is connected to one end of the clamping capacitor C31 to C34. The other end of the holding capacitor C21 to C24 and the drain of the clamping transistor M31 to M34 are connected in common to a reference voltage line REF, and the source of the clamping transistor M31 to M34 is connected to the other end of the clamping capacitor C31 to C34 and to an input end of the output buffer amplifier A31 to A34, i.e., to clamp output line CL11 to CL14. The gate of the clamping transistor M31 to M34 is connected in common to a clamp control line ϕCL.

FIG. 2 is an outlined drive timing chart for explaining operation at the time of horizontal mixing in the above described prior-art example. Here a description will be given with noticing operation of the first and second columns from left when the upper first row of the pixel section 1 is selected by the vertical scanning circuit 2. First, the power line VR1 is driven to VR1=H and row select line ϕROW1 to ϕROW1=H so as to turn ON the row select transistors M3 of the unit pixels P11 and P12. The signal voltages of photodiodes PD1 contained in the unit pixels P11 and P12 are thereby outputted to the vertical signal lines V11 and V12 through the amplifying transistors M2. The signal voltages on the vertical signal lines V11 and V12 at this time are referred to as $V_{V11\text{-}SIG}$ and $V_{V12\text{-}SIG}$.

Here, by driving the sampling control line ϕSH to ϕSH=H and clamp control line ϕCL to ϕCL=H at the noise suppressing section 4, the sampling transistors M21 and M22 and clamping transistors M31 and M32 are turned ON. The clamp output lines CL11 and CL12 are thereby set to a voltage value $V_{REF}$ of the reference voltage line REF so that difference voltages shown in the following formulas (1), (2) are accumulated at the clamping capacitors C31 and C32.

$$\text{Difference voltage accumulated at C31:} V_{V11\text{-}SIG} V_{REF} \quad (1)$$

$$\text{Difference voltage accumulated at C32:} V_{V12\text{-}SIG} - V_{REF} \quad (2)$$

where input buffer amplifiers A21 and A22 each are an amplifier having ideal gain=1.

Next, the clamp control line ϕCL is changed to ϕCL=L so as to bring the clamp output lines CL11 and CL12 into their high-impedance status, and then, after driving the row reset line ϕRST1 to ϕRST1=H, the condition of ϕRST1=L is attained again. The reset voltages of photodiodes PD1 contained in the unit pixel P11 and P12 are thereby outputted to the vertical signal line V11 and V12 through the amplifying transistors M2. At this time, supposing the reset voltages on the vertical signal lines V11 and V12 as $V_{V11\text{-}RST}$ and $V_{V12\text{-}RST}$ and supposing the difference voltages between the signal voltages of the vertical signal lines V11 and V12 and the reset voltage as $\Delta V_{V11}$ and $\Delta V_{V12}$, since the difference voltages occurring at the two ends of the clamping capacitors C31 and C32 are retained due to the fact that the clamp output lines CL11 and CL12 are in their high-impedance status, outputs corresponding to the difference voltages between the signal voltage and reset voltage shown in the following formulas (3) to (6) are obtained at the clamp output line voltages $V_{CL11}$ and $V_{CL12}$.

$$\Delta V_{V11} = V_{V11\text{-}RST} - V_{V11\text{-}SIG} \quad (3)$$

$$\Delta V_{V12} = V_{V12\text{-}RST} - V_{V12\text{-}SIG} \quad (4)$$

$$V_{CL11} = V_{REF} + \Delta V_{V11} \quad (5)$$

$$V_{CL12} = V_{REF} \Delta V_{V12} \quad (6)$$

Here, even when the thresholds of the amplifying transistors M2 contained in the unit pixels P11 and P12 are different from each other due to the manufacturing variance, since the threshold component is contained in both the signal voltage and reset voltage, an output with canceling variance in the threshold of the amplifying transistors M2 can be attained by obtaining the difference voltage between these. Subsequently, the pixel section 1 and the noise suppressing section 4 are disconnected from each other by changing the sampling control line φSH to φSH=L so as to turn OFF the sampling transistors M21 and M22, and next, the unit pixels P11, P12 and the vertical signal lines V11, V12 are disconnected by changing the row select line φROW1 to φROW1=L.

In continuation, by driving the horizontal mixing control line φAV-H to φAV-H=H to turn ON the horizontal mixing transistor M41, the clamp output lines CL11 and CL12 are connected to each other so that pixel signals of the unit pixels P11 and P12 after noise suppression are mixed along the horizontal direction. The clamp output line voltage $V_{CL11}$ ($=V_{CL12}$) after the horizontal mixing is expressed as in the following formula (7).

$$V_{CL11} V_{REF} + \{(\Delta V_{V11} + \Delta V_{V12})/2\} \quad (7)$$

where the clamping capacitors C31 and C32 are supposed to have the same capacitance value $C_{CL}$.

Similarly, the pixel signals of the unit pixels P13 and P14 after noise suppression are mixed in the horizontal direction. These horizontally mixed signals are sequentially outputted onto the output line 7 with skipping every other column through the horizontal select switch section 5 to be controlled by the horizontal scanning circuit 6 via the output amplifiers A31 to A34. The number of image data is thereby reduced to half.

SUMMARY OF THE INVENTION

It is an object of the present invention to provide solid-state imaging apparatus using an amplified MOS sensor in which function of mixing pixel signals can be achieved in an analog system without requiring an extra time for the mixing.

In a first aspect of the invention, there is provided a solid-state imaging apparatus including: a pixel section having unit pixels disposed two-dimensionally in rows and columns, each pixel containing a photoelectric conversion section and an amplifying section for amplifying output of the photoelectric conversion section to output a pixel signal; a vertical scanning section for selecting a row to be read out of the pixel section; a noise suppressing section having a noise suppressing function where noise suppression of the pixel signal is effected unit pixel by unit pixel and a signal mixing function where a plurality of the pixel signal are mixed along predetermined direction; a horizontal scanning section for causing the pixel signals along a horizontal direction processed through the noise suppressing section to be sequentially outputted from a horizontal signal line; and a mode control section for effecting control in accordance with each mode of a first mode where pixel signals after the noise suppression are outputted onto the horizontal signal line and a second mode where pixel signals after a parallel processing combining the noise suppression and the signal mixing are outputted onto the horizontal signal line. Embodiments 1 to 5 correspond to the first aspect.

In a second aspect of the invention, the noise suppressing section in the solid-state imaging apparatus according to the first aspect includes capacitors provided respectively for each of the columns and a switch for connecting between at least two of the capacitors, wherein the mode control section in the second mode effects control so as to apply on the capacitors a first output level of the pixel signals and without an interruption a second output level thereof in the condition where a plurality of the capacitors are connected through the switch. Embodiment 1 corresponds to the second aspect.

In a third aspect of the invention, the noise suppressing section in the solid-state imaging apparatus according to the first aspect includes for each of the columns a first capacitor, a second capacitor, a first switch for connecting between the first capacitor and the second capacitor, and a second switch for connecting between a plurality of the first capacitor, wherein the mode control section in the second mode effects control so as to apply on the second capacitor a first output level of the pixel signals and without an interruption a second output level thereof in the condition where N (N≧2) units of the first capacitor are connected through the second switch and M (M<N) units of the second capacitor are connected through the first switch. Embodiment 2 corresponds to the third aspect.

In a fourth aspect of the invention, the noise suppressing section in the solid-state imaging apparatus according to the first aspect includes a plurality of first capacitors provided in parallel at each one of the columns in a manner respectively corresponding to a plurality of rows and a first switch for selectively connecting between a plurality of the first capacitor at each one of the columns, wherein the mode control section in the second mode effects control so as to apply on the first capacitors a first output level of the pixel signals and without an interruption a second output level thereof in the condition where a plurality of the first capacitors of same one column selected by the first switch are connected to each other. Embodiments 3 to 5 correspond to the fourth aspect.

In a fifth aspect of the invention, the pixel section in the solid-state imaging apparatus according to the fourth aspect includes a plurality of signal lines in each one of the columns so that a plurality of pixels in same one column are connected to different ones of the signal lines by predetermined pixel units, wherein a plurality of the first capacitors are provided respectively for each signal line of the plurality of signal lines. Embodiments 3 to 5 correspond to the fifth aspect.

In a sixth aspect of the invention, the noise suppressing section in the solid-state imaging apparatus according to the fourth aspect further includes a second switch for connecting between a plurality of the first capacitors of different ones of the columns, wherein the mode control section in the second mode effects control so as to apply on the first capacitor a first output level of the pixel signals and without an interruption a second output level thereof in the condition where a plurality of the first capacitors of the different ones of the columns are connected through the second switch. Embodiment 4 corresponds to the sixth aspect.

In a seventh aspect of the invention, the noise suppressing section in the solid-state imaging apparatus according to the sixth aspect further includes a second capacitor and a third switch for connecting between the first capacitor and the second capacitor, wherein the mode control section in the second mode effects control so as to apply on the second capacitor a first output level of the pixel signals and without an interruption a second output level thereof in the condition where N (N≧2) units of the first capacitor are connected through the second switch and M (M<N) units of the second capacitor are connected through the third switch. Embodiment 5 corresponds to the seventh aspect.

DESCRIPTION OF THE PREFERRED EMBODIMENT

A most preferable mode for carrying out the invention will be described below with reference to the drawings.

Embodiment 1

Figure 1:
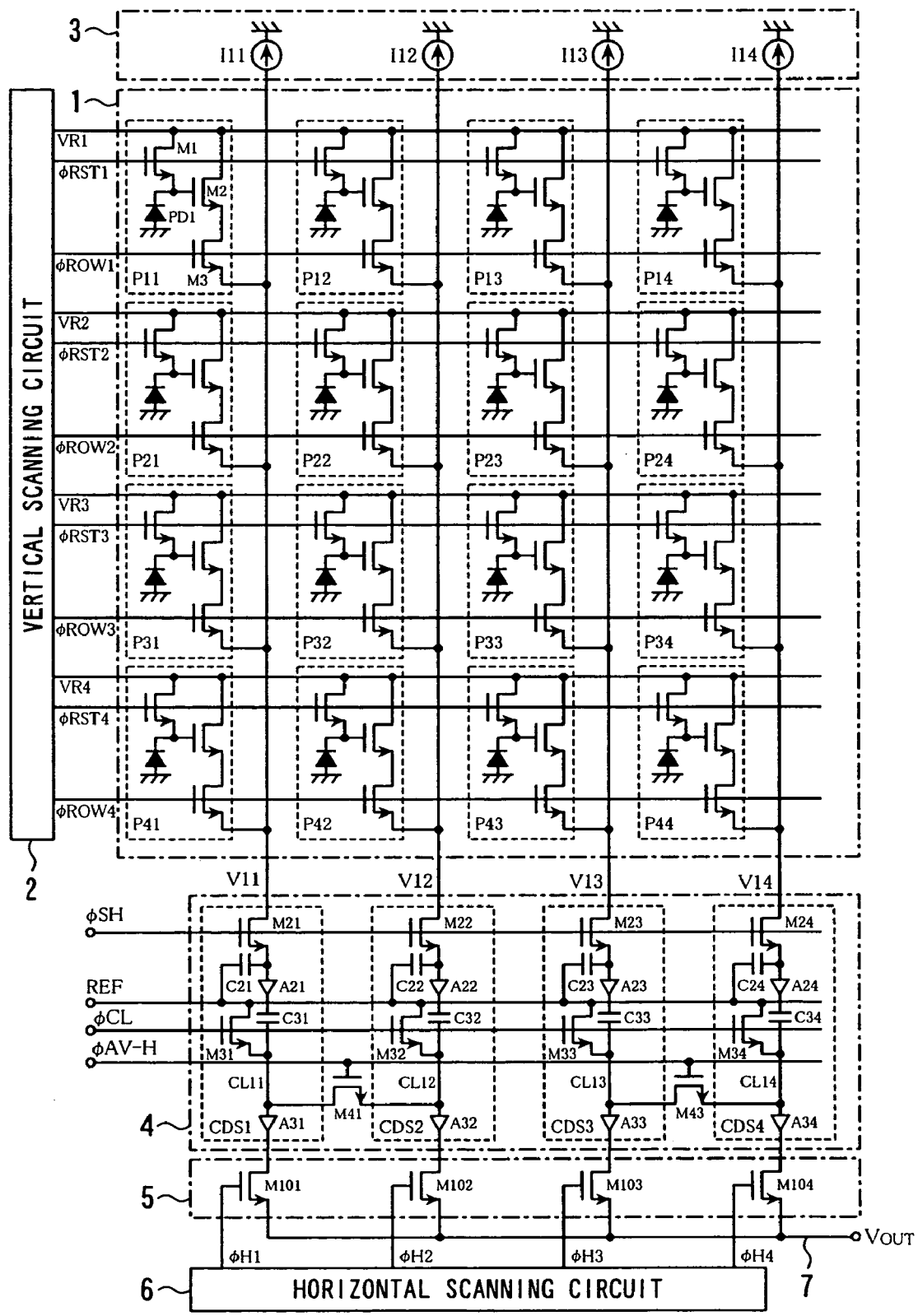
FIG. 1 is a circuit diagram showing an example of construction of prior-art solid-state imaging apparatus having a means for mixing pixel signals in a horizontal direction.
Figure 2:
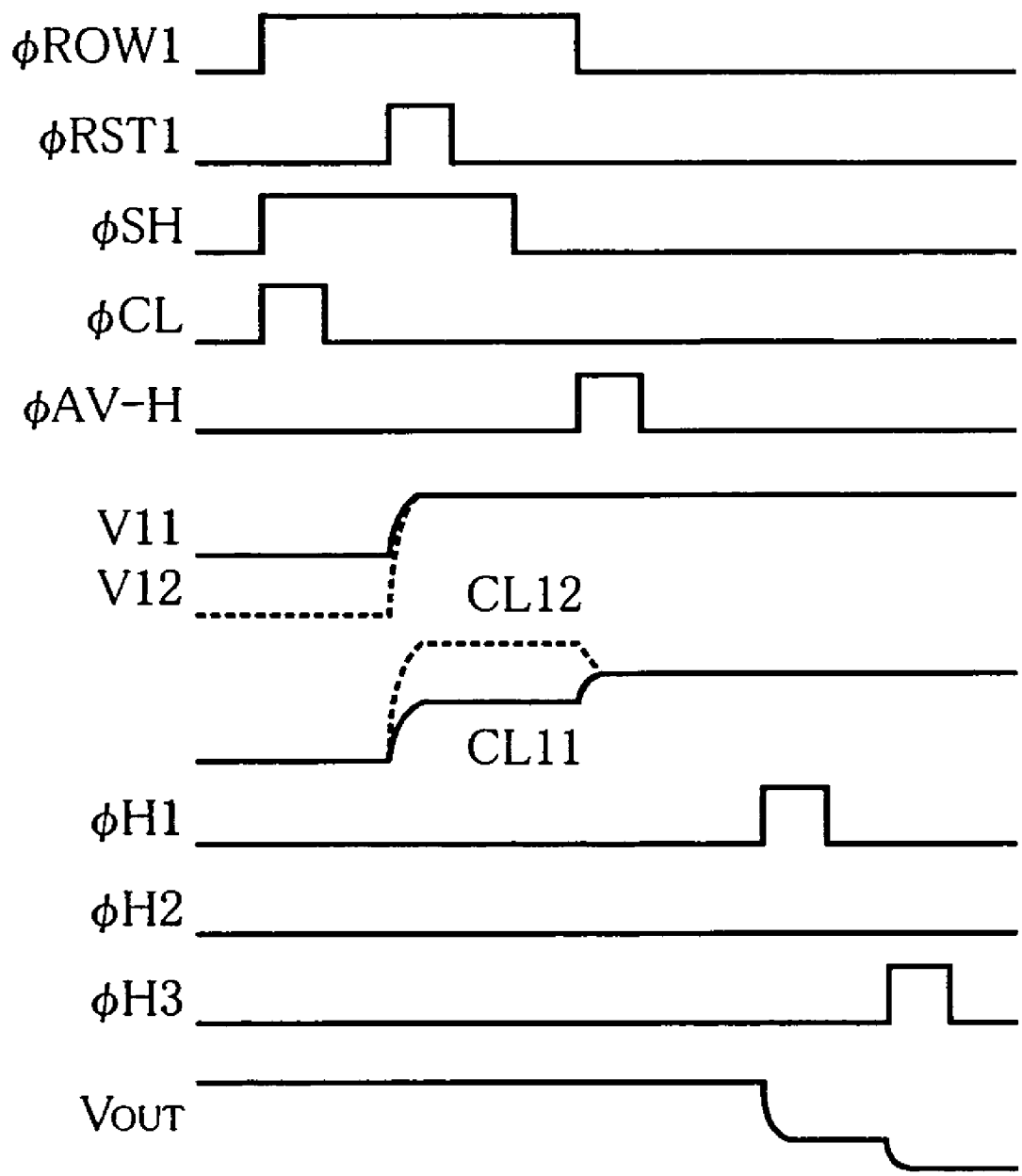
FIG. 2 is a drive timing chart for explaining operation at the time of horizontal mixing in the prior-art example shown in FIG. 1.
Figure 3:
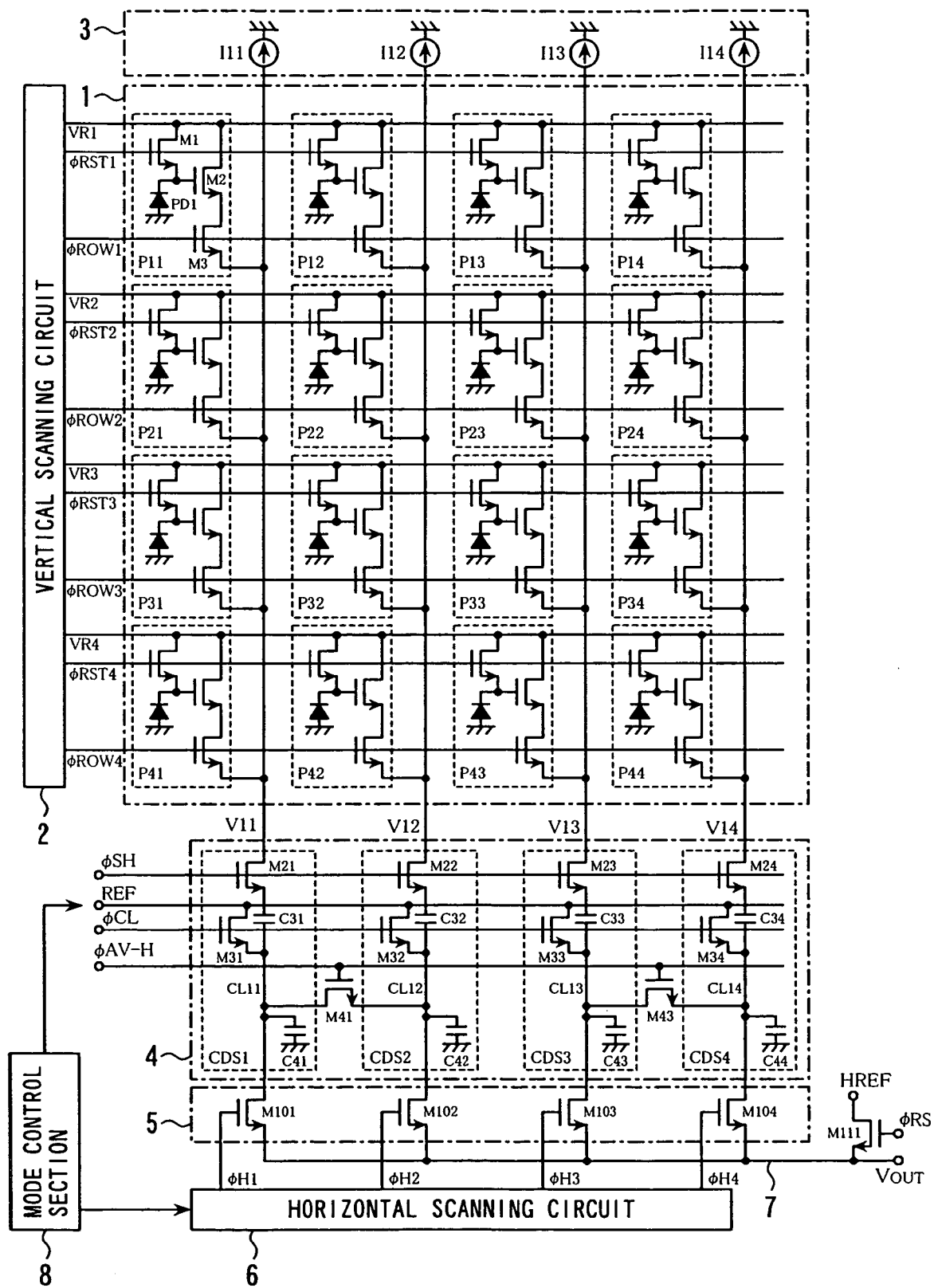
FIG. 3 is a circuit diagram showing construction of a first embodiment of the solid-state imaging apparatus according to the invention.

A first embodiment of the invention will now be described. FIG. 3 is a circuit diagram showing the first embodiment of solid-state imaging apparatus using an amplified MOS sensor according to the invention. Those components corresponding to those in the prior-art example shown in FIG. 1 are denoted by like reference numerals. The solid-state imaging apparatus according to the present embodiment includes: a pixel section 1 where unit pixels P11 to P44 are disposed two-dimensionally in rows and columns, here in a 4×4 pixel array; a vertical scanning circuit 2 for selecting a row to be read out of the pixel section 1; a current supplying section 3 having current sources I11 to I14 for supplying bias current to the pixel section 1; a noise suppressing section 4 for suppressing noise components contained in the output signal of the pixel section 1; a horizontal select switch section 5 having switching transistors M101 to M104 for outputting noise-suppressed signals; a horizontal scanning circuit 6 for outputting horizontal select pulses φH1 to φH4 for selecting column to be read out of the horizontal select switch section 5; an output line 7; and a mode control section 8 for determining operation timing of the noise suppressing section 4 and horizontal scanning circuit 6.

The unit pixels P11 to P44 each include: a photodiode PD1 serving as a photoelectric conversion section; a reset transistor M1 for resetting detection signal of photodiode PD1; an amplifying transistor M2 for amplifying signals of the photodiode PD1; and a row select transistor M3 for selecting the unit pixels in each row.

A row to be read out of pixel section 1 is then selected by means of power and signals to be applied on a power supply line VR1 to VR4, row reset line φRST1 to φRST4, and row select line φROW1 to φROW4 that are the outputs of the vertical scanning circuit 2, thereby pixel signals of the unit pixels P11 to P44 are read out row by row.

In the noise suppressing section 4, a noise suppressing circuit CDS1 to CDS4 consisting of a sampling transistor M21 to M24, clamping transistor M31 to M34, clamping capacitor C31 to C34, and holding capacitor C41 to C44 is respectively provided for each column. The noise suppressing section 4 is constructed by further providing horizontal mixing transistors M41 and M43 to be controlled by a horizontal mixing control line φAV–H to which clamp output lines CL11, CL12 and CL13, CL14 are respectively connected.

At each noise suppressing circuit CDS1 to CDS4, the drain of sampling transistor M21 to M24 is connected to respective vertical signal line V11 to V14, the source thereof to one end of the clamping capacitor C31 to C34, and the gate thereof is connected in common to a sampling control line φSH. The drain of the clamping transistor M31 to M34 is connected in common to a reference voltage line REF, the source thereof to clamp output line CL11 to CL14 together with the other end of the clamping capacitor C31 to C34, and the gate thereof is connected in common to a clamp control line φCL. Connected then to the clamp output line CL11 to CL14 is one end of holding capacitor C41 to C44 of which the other end is grounded.

Further, in the present embodiment, an output reset transistor M111 to be controlled by a reset control line φRS is provided on the output line 7.

Figure 4:
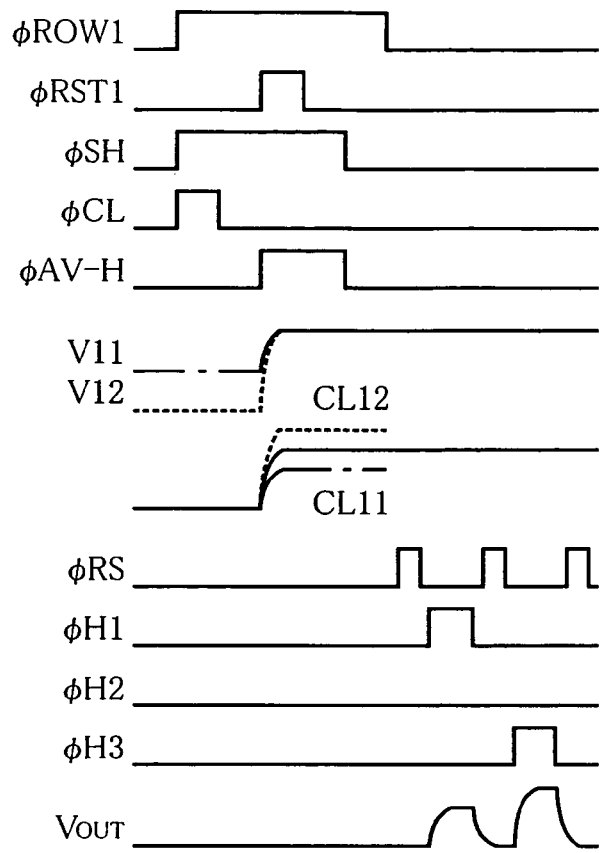
FIG. 4 is a drive timing chart for explaining operation at the time of horizontal mixing of the first embodiment shown in FIG. 3.

FIG. 4 is an outlined drive timing chart for explaining operation at the time of horizontal mixing in the present embodiment. Here a description will be given with noticing operation of the first and second columns from left when the upper first row of the pixel section 1 is selected by the vertical scanning circuit 2. First, the drive timing at the time of horizontal mixing is set to the noise suppressing section 4 and horizontal scanning circuit 6 by the control signal of the mode control section 8.

Next, by driving the power line VR1 to VR1=H and the row select line φROW1 to φROW1=H so as to turn ON the row select transistors M3 of the unit pixels P11 and P12, the signal voltages of photodiodes PD1 contained in the unit pixels P11 and P12 are outputted to the vertical signal lines V11 and V12 through the amplifying transistors M2. At this time the signal voltages on the vertical signal lines V11 and V12 are referred to as $V_{V11\text{-}SIG}$ and $V_{V12\text{-}SIG}$.

Here, by driving the sampling control line φSH to φSH=H and clamp control line φCL to φCL=H at the noise suppressing section 4, the sampling transistors M21 and M22 and clamping transistors M31 and M32 are turned ON. The clamp output lines CL11 and CL12 are thereby set to a voltage value $V_{REF}$ of the reference voltage line REF so that difference voltages shown in the following formulas (8), (9) are accumulated at the clamping capacitors C31 and C32.

Difference voltage accumulated at C31:$V_{V11\text{-}SIG} - V_{REF}$ (8)

Difference voltage accumulated at C32:$V_{V12\text{-}SIG} - V_{REF}$ (9)

Next, the clamp output lines CL11 and CL12 are brought into their high-impedance status by changing to the clamp control line φCL=L, and in addition the horizontal mixing control line φAV–H is driven to φAV–H=H. The horizontal mixing transistor M41 is thereby turned ON to connect between the clamp output lines CL11 and CL12.

In this condition, by driving the row reset line φRST1 to φRST1=H and then to φRST1=L again, the reset voltages of photodiodes PD1 contained in the unit pixel P11 and P12 are outputted to the vertical signal lines V11 and V12 through the amplifying transistors M2. At this time, supposing the reset voltages on the vertical signal lines V11 and V12 as $V_{V11\text{-}RST}$ and $V_{V12\text{-}RST}$ and supposing the difference voltages between the signal voltages of the vertical signal lines V11 and V12 and the reset voltage as $\Delta V_{V11}$ and $\Delta V_{V12}$, since the clamp output lines CL11 and CL12 are in their high-impedance status, the relationship of the following formulas (10) to (13) holds by a principle of conservation of electric charge.

$$\Delta V_{V11} - \Delta V_{CL11} = \Delta Q_{C31}/C_{31} \quad (10)$$

$$\Delta V_{V12} - \Delta V_{CL11} = \Delta Q_{C32}/C_{32} \quad (11)$$

$$\Delta V_{CL11} = \Delta Q/(C_{41}+C_{42}) \quad (12)$$

$$\Delta Q = \Delta Q_{C31} + \Delta Q_{C32} \quad (13)$$

where: amount of change in the clamp output line voltage $V_{CL11}(=V_{CL12})$ is $\Delta V_{CL11}(=\Delta V_{CL12})$; changes in amount of charge of the clamping capacitors C31 and C32 are $\Delta Q_{C31}$ and $\Delta Q_{c32}$; and change in the total charge of the holding capacitors C41 and C42 is $\Delta Q$.

Further, by rearranging the formulas (10) to (13) with supposing that the clamping capacitors C31 and C32 each have the same capacitance value $C_{CL}$ and that the holding capacitors C41 and C42 each have the same capacitance value $C_{SH}$ the following formulas (14), (15) are obtained.

$$\Delta V_{CL11} = [\{C_{CL}/(C_{CL}+C_{SH})\} \times (\Delta V_{V11}+\Delta V_{V12})/2] \quad (14)$$

$$V_{CL11} = V_{REF} + \Delta V_{CL11} \quad (15)$$
$$= V_{REF} + [\{C_{CL}/(C_{CL}+C_{SH})\} \times (\Delta V_{V11}+\Delta V_{V12})/2]$$

Accordingly, even when the thresholds of the amplifying transistors M2 contained in the unit pixels P11 and P12 are different from each other due to the manufacturing variance, since the threshold component is contained in both the signal voltage and reset voltage, an output with canceling variance in the thresholds of the amplifying transistors M2 can be attained by obtaining the difference voltage between these. In addition, the mixing operation of the pixel signals is terminated at the same time of completion of the noise suppressing operation of the pixel signals of the unit pixels P11 and P12.

Subsequently, the pixel section 1 and the noise suppressing section 4 are disconnected from each other by driving the sampling control line φSH to φSH=L so as to turn OFF the sampling transistors M21 and M22. At the same time, by driving the horizontal mixing control line φAV–H to φAV–H=L so as to turn OFF the horizontal mixing transistor M41, the clamp output lines CL11 and CL12 are disconnected from each other. Next, the unit pixels P11 and P12 and the vertical signal lines V11 and V12 are disconnected by changing the row select line φROW1 to φROW1=L. The mixing operation of the pixel signals of the unit pixels P13 and P14 is similarly effected.

The readout of these horizontally mixed signals onto the output line 7 from the noise suppressing section 4 is effected as follows. The output line 7 is first set to the voltage value $V_{HREF}$ of an output reference voltage line HREF by turning ON the output reset transistor M111 by means of the reset control line φRS=H. Then, after effecting an output line resetting operation that switches the reset control line φRS to φRS=L again, readout to the output line 7 is effected through the horizontal select switch section 5 selected by the horizontal scanning circuit 6. Here, the number of image data is reduced to half by causing the horizontal select switch section 5 to skip every other column by the horizontal scanning circuit 6 so that the mixed signals are read out onto the output line 7 only from the holding capacitors C41 and C43 and are outputted from an output terminal $V_{OUT}$.

On the other hand, when the horizontal mixing operation is not effected in this embodiment, the driving timing at the time of normal operation is set to the noise suppressing section 4 and horizontal scanning circuit 6 by the control signal of the mode control section 8. Thereafter, while keeping the horizontal mixing control line φAV–H to φAV–H=L in FIG. 4, the noise suppressing operation of the pixel signals is effected and, after termination of the noise suppressing operation, the output line reset operation and signal read operation from the noise suppressing section 4 are repeated. All the individual signals accumulated at the holding capacitors C41 to C44 are thereby read out to the output line 7 to obtain the total number of image data.

Figure 5:
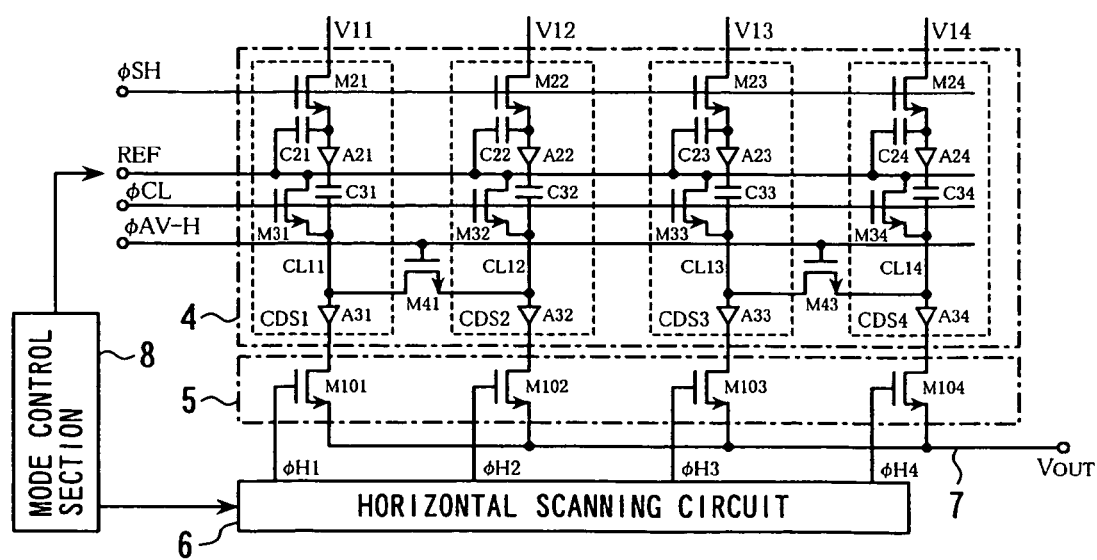
FIG. 5 is a circuit diagram showing a main portion of a modification of the first embodiment shown in FIG. 3.
Figure 6:
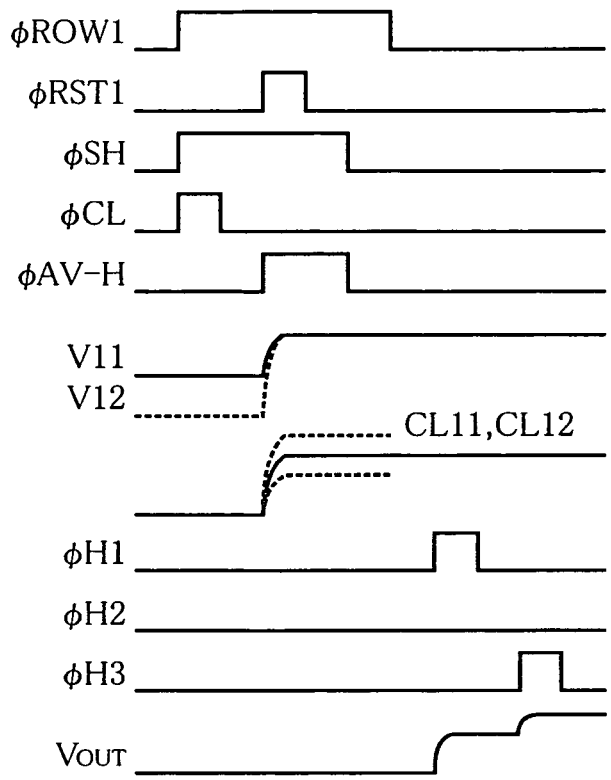
FIG. 6 is a drive timing chart for explaining operation at the time of horizontal mixing of the modification shown in FIG. 5.

FIG. 5 is a circuit diagram showing construction of the portion of the noise suppressing section and after of a modification of the first embodiment. In this modification, the construction of the noise suppressing section 4 is made identical to the circuit construction of the prior-art example shown in FIG. 1. FIG. 6 is an outlined drive timing chart for explaining operation at the time of horizontal mixing in the noise suppressing section 4 of the modification shown in FIG. 5. The horizontal mixing operation in this modification will now be described with noticing operation of the first and second columns from left when the upper first row of the pixel section 1 is selected by the vertical scanning circuit 2.

First, the drive timing at the time of horizontal mixing is set to the noise suppressing section 4 and horizontal scanning circuit 6 by the control signal of the mode control section 8. By driving the horizontal mixing control line φAV–H to φAV–H=H at the time of noise suppression of the unit pixels P11 and P12, the horizontal mixing transistor M41 is turned ON to connect between the clamp output lines CL11 and CL12, thereby the noise suppressing operation and horizontal mixing operation of the pixel signals are concurrently effected. Supposing that the clamping capacitors C31 and C32 each have the same capacitance value $C_{CL}$, the clamp output line voltage $V_{CL11}(=V_{CL12})$ after the noise suppressing operation is expressed as in the following formula (16) from a principle of conservation of electric charge where a similar output as in the prior-art example shown in formula (7) is obtained.

$$V_{CL11}V_{REF}+\{(\Delta V_{V11}+\Delta V_{V12})/2\} \quad (16)$$

The horizontal mixing operation of the pixel signals of the unit pixels P13 and P14 is similarly effected. The readout of signal from the noise suppressing section 4 to the output line 7 is similar to that in the prior-art example. The number of image data is reduced to half by causing the horizontal select switch section 5 to operate with skipping every other column by horizontal scanning circuit 6 so as to read only those mixed signals accumulated at the clamping capacitors C31 and C33 onto the output line 7.

On the other hand, when the horizontal mixing operation is not effected in this modification, the driving timing at the time of normal operation is set to the noise suppressing section 4 and horizontal scanning circuit 6 by the control signal of the mode control section 8. Thereafter, the noise suppressing operation of the pixel signals is effected while keeping the horizontal mixing control line φAV–H to φAV–H=L in FIG. 6. Then, after termination of the noise suppressing operation, the signal read operation from the noise suppressing section 4 is repeated to read all the individual signals accumulated at the clamping capacitors C31 to C34 onto to the output line 7. The total number of image data is thereby obtained.

As the above, according to the present embodiment, the noise suppressing operation of pixel signals and horizontal mixing operation of the pixel signals corresponding to two columns can be concurrently effected by driving the horizontal mixing control line φAV–H to φAV–H=H by the control signal from the mode control section 8 so as to connect between the clamp output lines CL11 and CL12 and between CL13 and CL14 at the time of noise suppression of the pixel signals of the unit pixels P11 to P44. Accordingly, pixel signals in the horizontal direction can be mixed without requiring an extra processing time.

Embodiment 2

Figure 7:
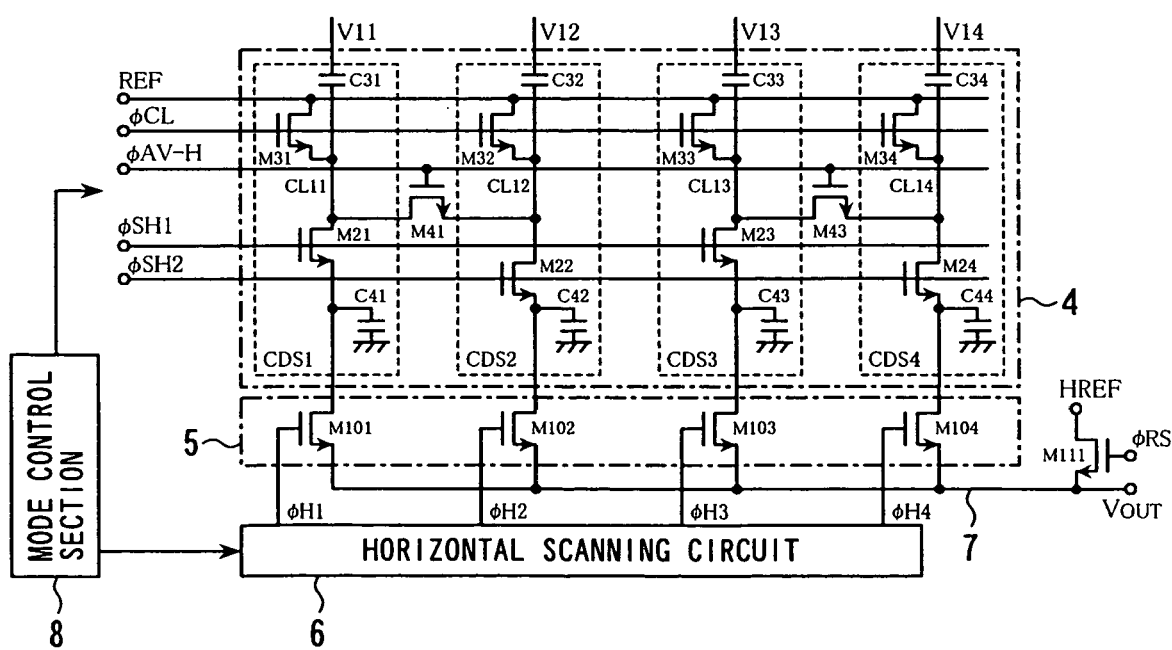
FIG. 7 is a circuit diagram showing construction of a main portion of solid-state imaging apparatus according to a second embodiment of the invention.

FIG. 7 is a circuit diagram showing construction of a main portion in a second embodiment of solid-state imaging apparatus using an amplified MOS sensor according to the invention. In this embodiment, the construction of the noise suppressing section 4 of the first embodiment shown in FIG. 3 is changed so that the horizontally mixed signal of two clamp output lines is accumulated only at a holding capacitor which is connected to one of the clamp output lines. Thereby amplitude of the horizontally mixed signal can be increased. The construction thereof will now be described. It should be noted that construction of the pixel section etc., other than those shown in the figure is identical to that of the first embodiment shown in FIG. 3, and those components corresponding to the first embodiment shown in FIG. 3 are denoted by like reference numerals in FIG. 7.

In the noise suppressing section 4 of this embodiment, a noise suppressing circuit CDS1 to CDS4 consisting of a sampling transistor M21 to M24, clamping transistor M31 to M34, clamping capacitor C31 to C34, and holding capacitor C41 to C44 is provided for each column. The noise suppressing section 4 is constructed by further providing horizontal mixing transistors M41 and M43 to be controlled by a horizontal mixing control line φAV–H to which clamp output lines CL11, CL12 and CL13, CL14 are respectively connected.

At each noise suppressing circuit CDS1 to CDS4, one end of the clamping capacitor C31 to C34 is connected to respective vertical signal line V11 to V14, and the other end thereof is connected to the clamp output line CL11 to CL14. The drain of the clamping transistor M31 to M34 is connected in common to a reference voltage line REF, the gate thereof is connected in common to a clamp control line φCL, and the source thereof to the clamp output line CL11 to CL14. The drain of the sampling transistor M21 to M24 is connected to the clamp output line CL11 to CL14, and the source thereof becomes the respective output end of the noise suppressing circuit CDS1 to CDS4. The gate of the sampling transistor M21 to M24 of every other column is connected in common to a first and second sampling control lines φSH1, φSH2, respectively. Connected to each output end of the noise suppressing circuit CDS1 to CDS4 is one end of the holding capacitor C41 to C44 of which the other end is grounded.

Figure 8:
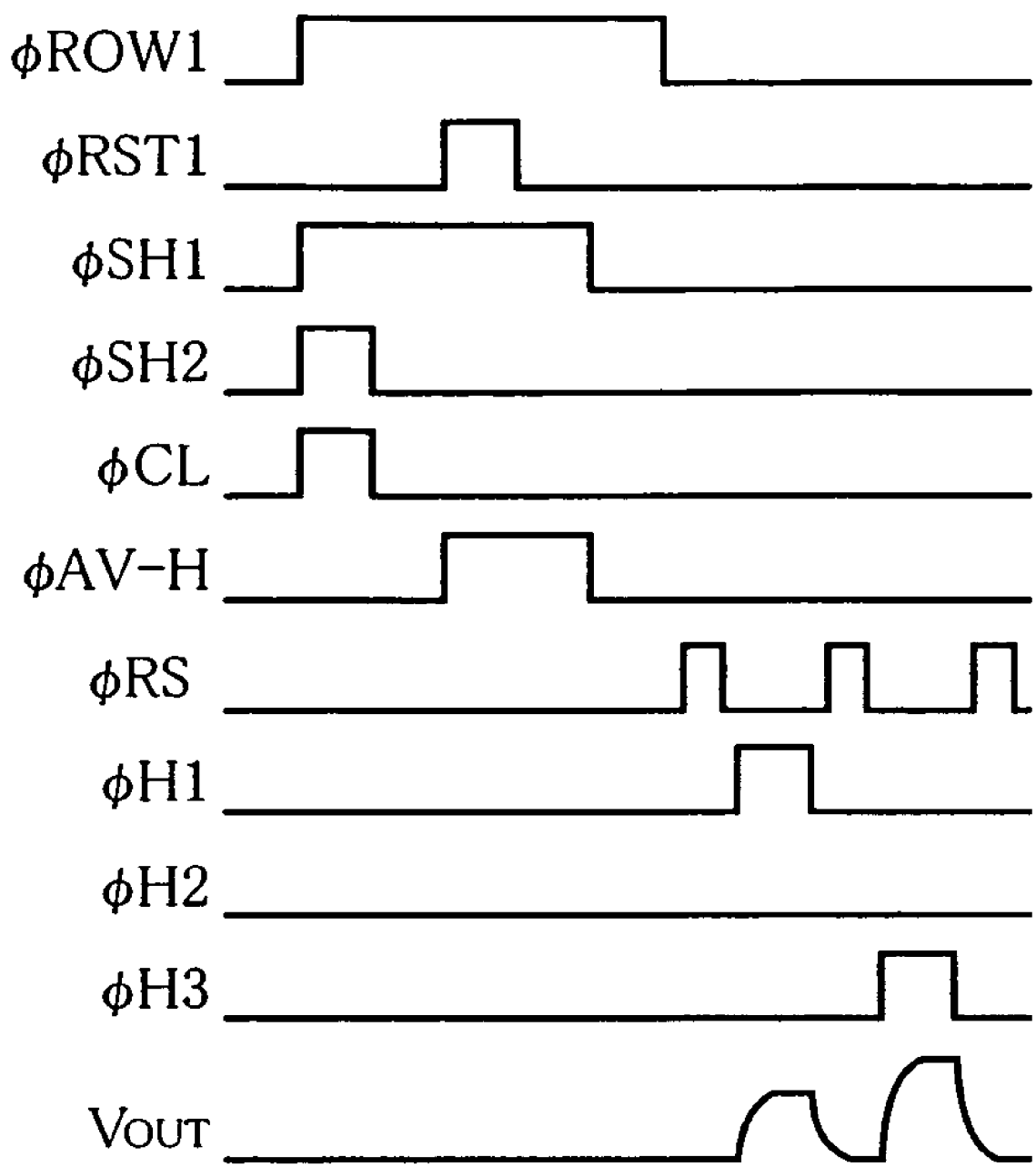
FIG. 8 is a drive timing chart for explaining operation at the time of horizontal mixing of the second embodiment shown in FIG. 7.

FIG. 8 is an outlined drive timing chart for explaining operation at the time of horizontal mixing in the present embodiment. Here a description will be given with noticing operation of the first and second columns from left when the upper first row of the pixel section 1 is selected by the vertical scanning circuit 2. First, the drive timing at the time of horizontal mixing is set to the noise suppressing section 4 and horizontal scanning circuit 6 by the control signal of the mode control section 8. It should be noted that operation for accumulating difference voltage between the signal voltage $V_{V11\text{-}SIG}$ of the vertical signal line V11 and the reference voltage $V_{REF}$ at the clamping capacitor C31 and operation for accumulating difference voltage between the signal voltage $V_{V12\text{-}SIG}$ of the vertical signal line V12 and the reference voltage $V_{REF}$ at the clamping capacitor C32 by driving the first and second sampling control lines φSH1, φSH2 to φSH1=φSH2=H and the clamp control line φCL to φCL=H are identical to those in the first embodiment and a description thereof will be omitted.

Next, by changing the clamp control line φCL to φCL=L so as to bring the clamp output lines CL11 and CL12 into their high-impedance status, and then by driving the horizontal mixing control line φAV–H to φAV–H=H, the horizontal mixing transistor M41 is turned ON to connect between the clamp output lines CL11 and CL12. Here, the sampling transistor M22 is turned OFF by changing the second sampling control line φSH2 to φSH2=L at a timing before attaining φAV–H=H, thereby the holding capacitor C42 is disconnected and only the holding capacitor C41 is connected to the clamp output lines CL11 and CL12.

In this condition, by driving the row reset line φRST1 to φRST1=H and then to φRST1=L again, the reset voltages of photodiodes PD1 contained in the unit pixels P11 and P12 are outputted respectively to the vertical signal lines V11 and V12 through the amplifying transistors M2. At this time, supposing the reset voltages on the vertical signal lines V11 and V12 respectively as $V_{V11\text{-}RST}$ and $V_{V12\text{-}RST}$ and supposing the difference voltages between the signal voltages of the vertical signal lines V11 and V12 and the reset voltage as $\Delta V_{V11}$ and $\Delta V_{V12}$, the voltage change amount of clamp output line $\Delta V_{CL11} (=\Delta V_{CL12})$ and the clamp output line voltage $V_{CL11} (=V_{CL12})$ after noise suppression are expressed as in the following formulas (17), (18) due to a principle of conservation of electric charge at the clamp output lines CL11 and CL12 which are in their high-impedance status.

$$\Delta V_{CL11}[\{2C_{CL}/(2C_{CL}+C_{SH})\}\times(\Delta V_{V11}+\Delta V_{V12})/2] \quad (17)$$

$$V_{CL11}=V_{REF}+[\{2C_{CL}/(2C_{CL}+C_{SH})\}\times(\Delta V_{V11}+\Delta V_{V12})/2] \quad (18)$$

where the clamping capacitors C31 and C32 each have the same capacitance value $C_{CL}$, and the holding capacitor C41 has a capacitance value of $C_{SH}$.

Accordingly, the mixing operation of the pixel signals is terminated at the same time of completion of the noise suppressing operation of the pixel signals of the unit pixels P1 and P12. In addition, the output amplitude of mixed signal can be increased by accumulating the mixed signal only at the holding capacitor C41. Supposing $C_{CL}=C_{SH}$, the voltage change amount $\Delta V_{CL11}$ of the clamp output line of the formula (17) becomes 1.33 times that in the formula (14) of the first embodiment.

Subsequently, the holding capacitor C41 is disconnected from the clamp output line CL11 by driving the first sampling control line φSH1 to φSH1=L so as to turn OFF the sampling transistor M21. At the same time, by driving the horizontal mixing control line φAV-H to φAV-H=L so as to turn OFF the horizontal mixing transistor M41, the clamp output lines CL11 and CL12 are disconnected from each other. Next, the unit pixels P11 and P12 and the vertical signal lines V11 and V12 are disconnected by change to the row select line φROW1=L. In a similar manner, the mixing operation of the pixel signals of the unit pixels P13 and P14 is also effected.

The readout of these horizontally mixed signals onto the output line 7 from the noise suppressing section 4 is similar to the first embodiment, and the number of image data is reduced to half by causing the horizontal select switch section 5 to operate with skipping every other column by the horizontal scanning circuit 6 so that only the mixed signals accumulated at the holding capacitors C41 and C43 are read out onto the output line 7.

On the other hand, when the horizontal mixing operation is not effected in this embodiment, the driving timing at the time of normal operation is set to the noise suppressing section 4 and horizontal scanning circuit 6 by the control signal of the mode control section 8. Thereafter, while keeping the horizontal mixing control line φAV-H to φAV-H=L in FIG. 8, the noise suppressing operation of the pixel signals is effected. Then, after termination of the noise suppressing operation, the output line reset operation and signal read operation from the noise suppressing section 4 are repeated to read all the individual signals accumulated at the holding capacitors C41 to C44 onto the output line 7. The total number of image data is thereby obtained.

As the above, according to the present embodiment, the noise suppressing operation of pixel signals and horizontal mixing operation of pixel signals corresponding to two columns can be concurrently effected by driving the horizontal mixing control line φAV-H to φAV-H=H by the control signal from the mode control section 8 so as to connect between the clamp output lines CL11 and CL12 and between CL13 and CL14 at the time of noise suppression of the unit pixels P11 to P44. Accordingly, pixel signals in the horizontal direction can be mixed without requiring an extra processing time. In addition, by accumulating horizontally mixed signals only at the holding capacitors C41 and C43 of every other column, the output amplitude of the horizontally mixed signals is increased so that deterioration of signal quality due to noise occurring at subsequent stage can be suppressed.

Embodiment 3

Figure 9:
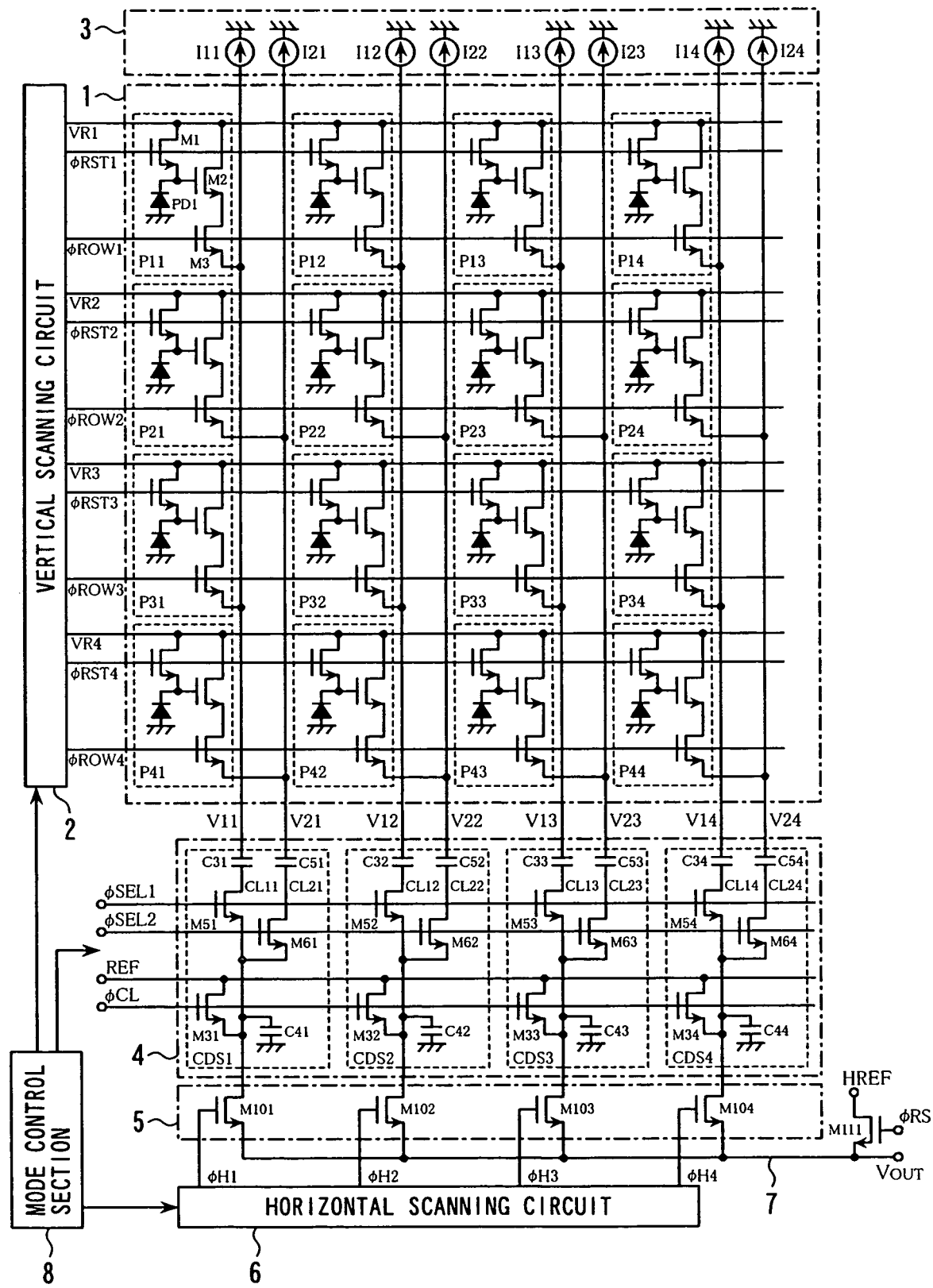
FIG. 9 is a circuit diagram showing construction of solid-state imaging apparatus according to a third embodiment of the invention.

FIG. 9 is a circuit diagram showing a third embodiment of solid-state imaging apparatus using an amplified MOS sensor according to the invention. This embodiment is provided with two vertical signal lines in each one column of the pixel section 1 and is constructed as capable of concurrently effecting differential processing of the pixel signals corresponding to two rows at the noise suppressing section 4 so that, by concurrently reading pixel signals corresponding to two rows by the vertical scanning circuit 2, a noise suppressing operation of the pixel signals and a vertical mixing operation of the pixel signals corresponding to two rows can be concurrently effected. Its construction will now be described. Those components corresponding to the first embodiment are denoted by like reference numerals.

At the pixel section 1, vertical signal lines are independently disposed for odd-number rows and for even-number rows so that two vertical signal lines per column V11, V21; V12, V22; V13, V23; V14, V24 are provided. Two rows of pixel signals can be concurrently read out by power line VR1 to VR4, row reset line φRST1 to φRST4, and row select line φROW1 to φROW4 which are the outputs of the vertical scanning circuit 2. At the noise suppressing section 4, provided for each column is a noise suppressing circuit CDS1 to CDS4 which includes: vertical signal select transistors M51 to M54 and M61 to M64; a clamping transistor M31 to M34; clamping capacitors C31 to C34 and C51 to C54; and a holding capacitor C41 to C44. A mode control section 8 is to determine operation timings of the vertical scanning circuit 2, noise suppressing section 4, and horizontal scanning circuit 6.

At each of the noise suppressing circuits CDS1 to CDS4, one end of the clamping capacitors C31 to C34 and C51 to C54 is respectively connected to the two vertical signal lines V11 to V14 and V21 to V24 and the other end thereof to clamp output lines CL11 to CL14 and CL21 to CL24. The drain of the vertical select transistors M51 to M54 and M61 to M64 is connected to clamp output lines CL11 to CL14 and CL21 to CL24, and the source thereof is connected in common to the output end of the respective noise suppressing circuit CDS1 to CDS4. Further the gate of the vertical select transistor M51 to M54 is connected in common to a first vertical signal select control line φSEL1 and the gate of the vertical select transistor M61 to M64 is connected in common to a second vertical signal select control line φSEL2. The drain of the clamping transistor M31 to M34 is connected in common to a reference voltage line REF, the gate thereof in common to a clamp control line φCL, and the source thereof to the output end of the respective noise suppressing circuit CDS1 to CDS4. Further, connected to the output end of each noise suppressing circuit CDS1 to CDS4 is one end of the holding capacitor C41 to C44 of which the other end is grounded.

Figure 10:
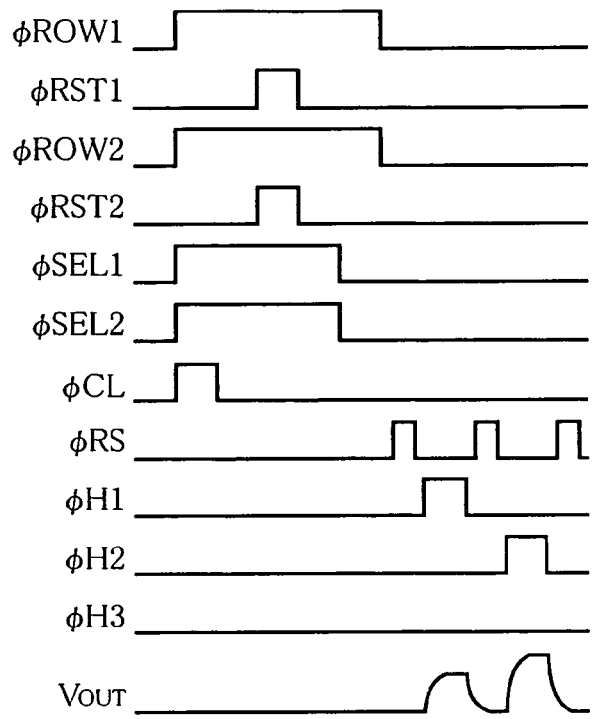
FIG. 10 is a drive timing chart for explaining operation at the time of vertical mixing of the third embodiment shown in FIG. 9.

FIG. 10 is an outlined drive timing chart for explaining operation at the time of vertical mixing in the present embodiment. Here a description will be given with noticing operation of the first column from left when the upper first and second rows of the pixel section 1 are selected by the vertical scanning circuit 2. First, the drive timing at the time of vertical mixing is set to the vertical scanning circuit 2, noise suppressing section 4 and horizontal scanning circuit 6 by the control signal of the mode control section 8. It should be noted that operation for accumulating difference voltage between the signal voltage $V_{V11\text{-}SIG}$ of the vertical signal line V11 and the reference voltage $V_{REF}$ at the clamping capacitor C31 and operation for accumulating difference voltage between the signal voltage $V_{V12\text{-}SIG}$ of the vertical signal line V21 and the reference voltage $V_{REF}$ at the clamping capacitor C51 at the time of the power line VR1=VR2=H and the row select line φROW1=φROW2=H when the first and second vertical signal select control lines φSEL1, φSEL2 are driven to φSEL1=φSEL2=H and the clamp control line φCL is driven to φCL=H are identical to the operation in the first embodiment and a description thereof will be omitted.

Next, the clamp control line φCL is changed to φCL=L so as to bring the clamp output lines CL11 and CL21 into their high-impedance status. At this time, due to the respective vertical signal select control line φSEL1=φSEL2=H, the clamp output lines CL11 and CL12 are connected to each other through the vertical signal select transistors M51 and M61. In this condition, by driving the row reset lines φRST1, φRST2 to φRST1=φRST2=H and then to φRST1=φRST2=L again, the reset voltages of photodiodes PD1 contained in the unit pixels P11 and P21 are outputted respectively to the vertical signal lines V11 and V21 through the amplifying transistors M2. At this time, supposing the reset voltages on the vertical signal lines V11 and V21 respectively as $V_{V11-RST}$ and $V_{V21-RST}$ and supposing the difference voltages between the signal voltages of the vertical signal lines V11 and V21 and the reset voltage as $\Delta V_{V11}, \Delta V_{V21}$, the voltage change amount of clamp output line $\Delta V_{CL11} (=\Delta V_{CL12})$ and the clamp output line voltage $V_{CL11}(=V_{CL12})$ after noise suppression are expressed as in the following formulas (19), (20) from a principle of conservation of electric charge.

$$\Delta V_{CL11} = [\{2C_{CL}/(2C_{CL}C_{SH})\} \times (\Delta V_{V11} \Delta V_{V21})/2] \quad (19)$$

$$V_{CL11} = V_{REF} + [\{2C_{CL}/(2C_{CL} + C_{SH})\} \times (\Delta V_{V11} \Delta V_{V21})/2] \quad (20)$$

where the clamping capacitors C31 and C51 each have the same capacitance value $C_{CL}$, and the holding capacitor C41 has a capacitance value of $C_{SH}$.

Accordingly, at the same time of completion of the noise suppressing operation of the pixel signals of the unit pixels P1 and P21, the mixing operation of the two pixel signals is also terminated. Thereafter, the clamp output lines CL11 and CL21 are disconnected from the holding capacitor C41 by driving the respective vertical signal select control lines φSEL1, φSEL2 to φSEL1=φSEL2=L so as to turn OFF the vertical signal select transistors M51 and M61. Also, the unit pixels P1 and P21 are disconnected from the vertical signal lines V11 and V21 by changing the row select lines φROW1, φROW2 to φROW1=φROW2=L. The vertical mixing of the pixel signals of the unit pixels of the second to fourth columns is also similarly effected.

The readout of these vertically mixed signals onto the output line 7 from the noise suppressing section 4 is effected through the horizontal select switch section 5 selected by the horizontal scanning circuit 6 after turning ON the output reset transistor M111 by the reset control line φRS=H to set the output line 7 to a voltage value $V_{HREF}$ of an output reference voltage line HREF and effecting an output line reset operation where the reset control line φRS is switched again to φRS=L. Here, the number of image data is reduced to half because the number of times of selecting a row to be read out of the pixel section 1 is one half.

Figure 11:
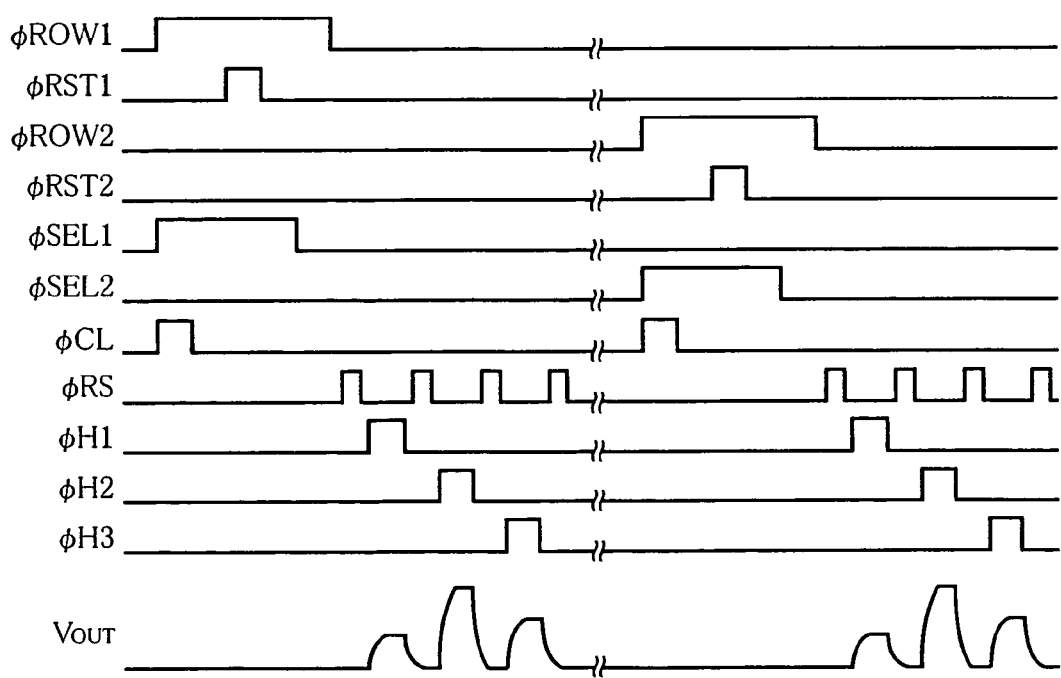
FIG. 11 is a drive timing chart for explaining operation at the time of normal operation without effecting a vertical mixing in the third embodiment shown in FIG. 9.

On the other hand, when the vertical mixing operation is not effected in this embodiment, the driving timing at the time of normal operation is set to the vertical scanning circuit 2, noise suppressing section 4 and horizontal scanning circuit 6 by the control signal of the mode control section 8. Thereafter, the first and second vertical signal select control lines φSEL1 and φSEL2 are controlled as shown in FIG. 11 to effect noise suppression of the pixel signals row by row. Then, by repeating the output line reset operation and signal read operation after termination of the noise suppressing operation, all the individual signals accumulated at the holding capacitors C41 to C44 are read out onto the output line 7, thereby obtaining the total number of image data.

As the above, according to the present embodiment, a noise suppression of pixel signals and vertical mixing of the pixel signals corresponding to two rows can be concurrently effected by concurrently reading the pixel signals corresponding to two rows from the pixel section 1 by the control signal of the mode control section 8 and by driving the respective vertical signal select control lines SEL1, φSEL2 to φSEL1=φSEL2=H at the time of noise suppression so as to connect between the clamp output lines CL11 and CL21 within the same one column. Accordingly, it is possible to mix pixel signals in the vertical direction within a period for reading pixel signals corresponding to one row.

Embodiment 4

Figure 12:
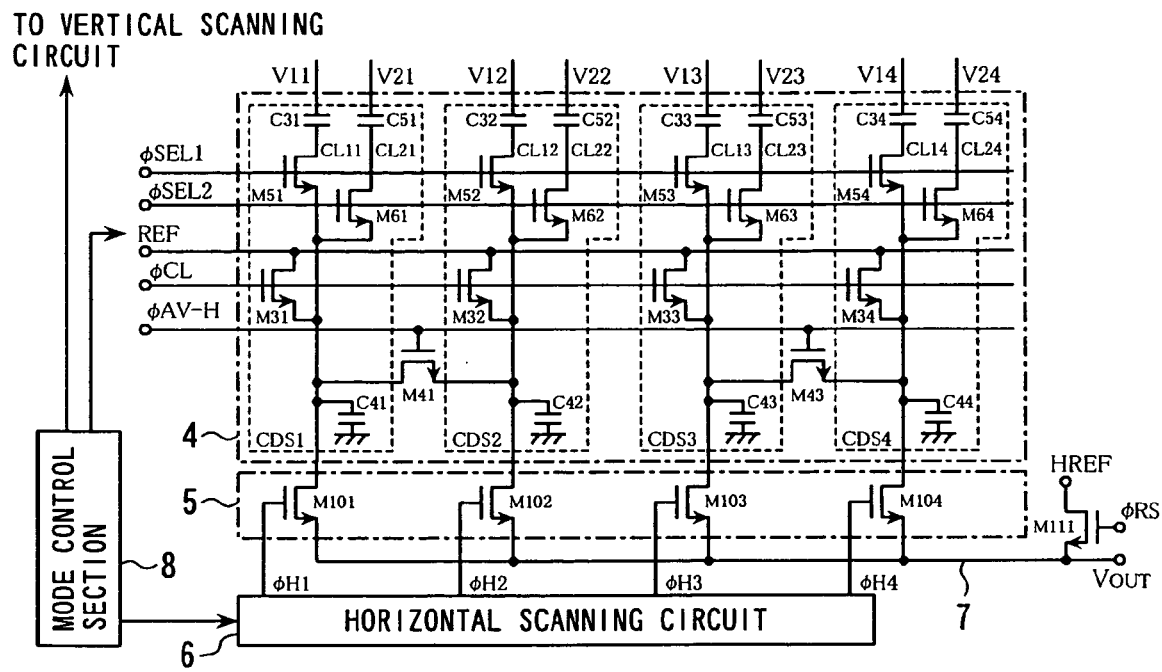
FIG. 12 is a circuit diagram showing construction of a main portion of solid-state imaging apparatus according to a fourth embodiment of the invention.

FIG. 12 is a circuit diagram showing construction of a main portion of a fourth embodiment of solid-state imaging apparatus using an amplified MOS sensor according to the invention. In this embodiment, the construction of the noise suppressing section 4 is changed as compared to the third embodiment to deal with both a vertical mixing and horizontal mixing so that noise suppressing operation of pixel signals and mixing operation of the pixel signals corresponding to two rows and two columns can be concurrently effected. Its construction will now be described. It should be noted that construction of the pixel section etc., other than those shown in the figure is identical to that of the third embodiment shown in FIG. 9, and those components corresponding to the third embodiment shown in FIG. 9 are denoted by like reference numerals in FIG. 12.

At the noise suppressing section 4 of this embodiment, provided for each column is a noise suppressing circuit CDS1 to CDS4 which includes: vertical signal select transistors M51 to M54 and M61 to M64; a clamping transistor M31 to M34; clamping capacitors C31 to C34 and C51 to C54; and a holding capacitor C41 to C44. This construction is similar to the third embodiment shown in FIG. 9. This embodiment is different from the third embodiment in that the noise suppressing section 4 is constructed by further providing horizontal mixing transistors M41 and M43 to be controlled by horizontal mixing control line φAV–H, for connecting between the holding capacitors C41 and C42 and between the holding capacitors C43 and C44.

Figure 13:
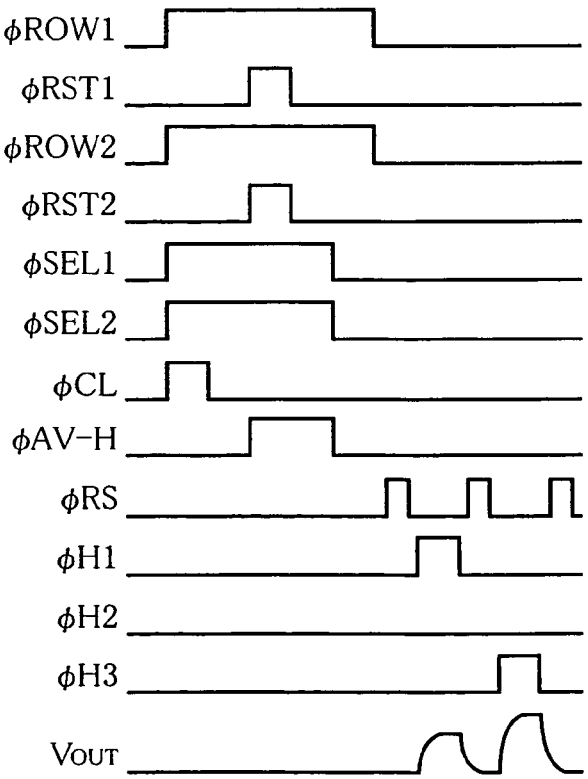
FIG. 13 is a drive timing chart for explaining operation at the time of vertical and horizontal mixing in the fourth embodiment shown in FIG. 12.

FIG. 13 is an outlined drive timing chart for explaining operation at the time of vertical and horizontal mixing in the present embodiment. A description will be given below with noticing operation of the first and second columns from left when the upper first and second rows of the pixel section 1 are selected by the vertical scanning circuit 2. The drive timing at the time of vertical and horizontal mixing is set to the vertical scanning circuit 2, noise suppressing section 4 and horizontal scanning circuit 6 by the control signal of the mode control section 8. It should be noted that operation for accumulating difference voltages between the signal voltage of the respective vertical signal line and the reference voltage $V_{REF}$ at the clamping capacitors C31 and C51 as well as at C32 and C52 with driving the power lines VR1, VR2 to VR1=VR2=H, row select lines φROW1, φROW2 to φROW1=φROW2=H and clamp control line φCL to φCL=H is identical to the third embodiment and a description thereof will be omitted.

Next, the clamp control line φCL is changed to φCL=L so as to bring the clamp output lines CL11 and CL21 as well as CL12 and CL22 into their high-impedance status. At this time, due to the respective vertical signal select control line φSEL1=φSEL2=H, the clamp output lines CL11 and CL21 as well as CL12 and CL22 are respectively connected through the vertical signal select transistors M51 and M61 as well as M52 and M62. By then driving the horizontal mixing control line φAV–H to φAV–H=H, the horizontal mixing transistor M41 is turned ON to connect between the holding capacitors C41 and C42.

In this condition, by driving the row reset lines φRST1, φRST2 to φRST1=φRST2=H and then to φRST1=φRST2=L again, the reset voltages of photodiodes PD1 contained in the unit pixels P11 and P21 as well as P12 and P22 are outputted respectively to the vertical signal lines V11 and V21 as well as V12 and V22 through the amplifying transistors M2. At this time, supposing the reset voltages on the vertical signal lines V11 and V21 as well as V12 and V22 respectively as $V_{V11\text{-}RST}$ and $V_{V21\text{-}RST}$ as well as $V_{V12\text{-}RST}$ and $V_{V22\text{-}RST}$ and supposing the difference voltages between the signal voltage of the vertical signal lines V11 and V21 as well as V12 and V22, and the reset voltage as $\Delta V_{V11}$ and $\Delta V_{V21}$ as well as $\Delta V_{V12}$ and $\Delta V_{V22}$, the voltage change amount $\Delta V_{CL11}$ ($=\Delta V_{CL21}=\Delta V_{CL12}=\Delta V_{CL22}$) of clamp output line and the clamp output line voltage $V_{CL11}(=V_{CL21}=V_{CL12}=V_{CL22})$ after noise suppression are expressed as in the following formulas (21), (22) from a principle of conservation of electric charge.

$$\Delta V_{CL11}=[\{2C_{CL}/(2C_{CL}+C_{SH})\}\times(\Delta V_{V11}\Delta V_{V21}\Delta V_{V12}+ \Delta V_{V22})/2] \quad (21)$$

$$V_{CL11}=V_{REF}+[\{2C_{CL}/(2C_{CL}+C_{SH})\}\times (\Delta V_{V11}\Delta V_{V21}\Delta V_{V12}\Delta V_{V22})/2] \quad (22)$$

where the clamping capacitors C31 and C51 as well as C32 and C52 each have the same capacitance value $C_{CL}$, and the holding capacitors C41 and C42 each have a capacitance value of $C_{SH}$.

Accordingly, at the same time of completion of the noise suppressing operation of the unit pixels P11 and P21 as well as P12 and P22, the mixing operation of the pixel signals is also terminated. Thereafter, by driving the respective vertical signal select control lines φSEL1, φSEL2 to φSEL1=φSEL2=L so as to turn OFF the vertical signal select transistors M51 and M61 as well as M52 and M62, the clamp output lines CL11 and CL21 are disconnected from the holding capacitor C41, and the clamp output lines CL12 and CL22 are similarly disconnected from the holding capacitor C42. Further, the holding capacitors C41 and C42 are disconnected from each other by driving the horizontal mixing control line φAV–H to φAV–H=L so as to turn OFF the horizontal mixing transistor M41. The unit pixels P11 and P21 as well as P12 and P22 are then disconnected respectively from the vertical signal lines V11 and V21 as well as from V12 and V22 by changing the row select lines φROW1, φROW2 to φROW1=φROW2=L. The reading of the pixel signals of the third and fourth columns is also similarly effected.

The readout of these mixed signals corresponding to 2 rows and 2 columns onto the output line 7 from the noise suppressing section 4 is effected through the horizontal select switch section 5 selected by the horizontal scanning circuit 6 after turning ON the output reset transistor M11 by the reset control line φRS=H to set the output line 7 to a voltage value $V_{HREF}$ of the output reference voltage line HREF and effecting an output line reset operation where the reset control line φRS is switched to φRS=L again. Here, the number of image data is reduced to ¼ by reducing the number of times of selecting a row to be read out of the pixel section 1 to half and by causing operation of the horizontal select switch section 5 to skip every other column by the horizontal scanning circuit 6 so as to read signals out to the output line 7 only from the holding capacitors C41 and C43.

In the case where only the vertical mixing operation is to be effected in this embodiment, the driving timing at the time of vertical mixing is set to the vertical scanning circuit 2, noise suppressing section 4, and horizontal scanning circuit 6 by the control signal of the mode control section 8. Thereafter, while keeping the horizontal mixing control line φAV–H to φAV–H=L in FIG. 13, two rows of noise suppression of the pixel signals are concurrently effected. By then repeating the output line reset operation and signal read operation from the noise suppressing section 4 after termination of the noise suppressing operation, all the mixed signals accumulated at the holding capacitors C41 to C44 are read out onto the output line 7. The number of image data is thereby reduced to half.

Figure 14:
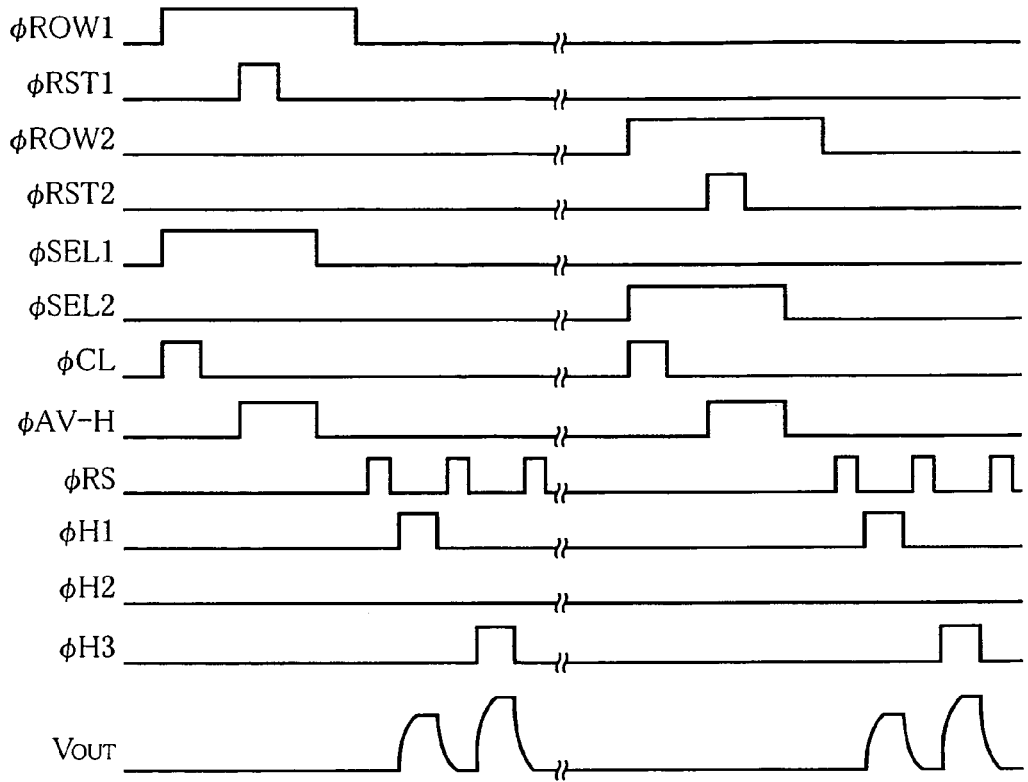
FIG. 14 is a drive timing chart for explaining operation at the time of operation only of horizontal mixing in the fourth embodiment shown in FIG. 12.

Further, in the case where only the horizontal mixing operation is to be effected in this embodiment, the driving timing at the time of horizontal mixing is set to the vertical scanning circuit 2, noise suppressing section 4, and horizontal scanning circuit 6 by the control signal of the mode control section 8. Thereafter, the first and second vertical signal select control lines φSELL and φSEL2 are controlled as shown in FIG. 14 to effect noise suppression of the pixel signals row by row. Then, by repeating the output line reset operation and signal read operation after termination of the noise suppressing operation, only the mixed signals accumulated at the holding capacitors C41 and C43 are read out onto the output line 7. The number of image data is thereby reduced to half.

Furthermore, when the vertical mixing and horizontal mixing are not effected in this embodiment, the driving timing at the time of normal operation is set to the vertical scanning circuit 2, noise suppressing section 4 and horizontal scanning circuit 6 by the control signal of the mode control section 8. Thereafter, the noise suppressing operation of pixel signals is effected row by row with setting the horizontal mixing control line φAV–H in FIG. 14 to φAV–H=L. By then repeating the output line reset operation and signal read operation after termination of the noise suppressing operation, all the individual signals accumulated at the holding capacitors C41 to C44 are read out onto the output line 7. The total number of image data is thereby obtained.

As the above, according to the present embodiment, the noise suppression of pixel signals and mixing of the pixel signals corresponding to two rows can be concurrently effected by concurrently reading the pixel signals corresponding to two rows from the pixel section 1 by the control signal of the mode control section 8 and by driving the respective vertical signal select control lines φSEL1, φSEL2 to φSEL1=φSEL2=H at the time of the noise suppression so as to connect respectively between the clamp output lines CL11 and CL21, between CL12 and CL22, between CL13 and CL23, and between CL14 and CL24 within the same column. In addition, mixing of pixel signals corresponding to two columns can be also concurrently effected by driving the horizontal mixing control line φAV–H to φAV–H=H by the control signal of the mode control section 8 so as to respectively connect between the holding capacitors C41 and C42 of the noise suppressing circuits CDS1 and CDS2 as well as between the holding capacitors C43 and C44 of the noise suppressing circuits CDS3 and CDS4. As a result, the noise suppression of pixel signals and the mixing operation of the pixel signals corresponding to two rows and two columns can be concurrently effected. Accordingly, pixel signals in the vertical direction can be mixed within a period for reading pixel signals corresponding to one row, and at the same time pixel signals in the horizontal direction can be mixed without requiring an extra processing time.

Embodiment 5

Figure 15:
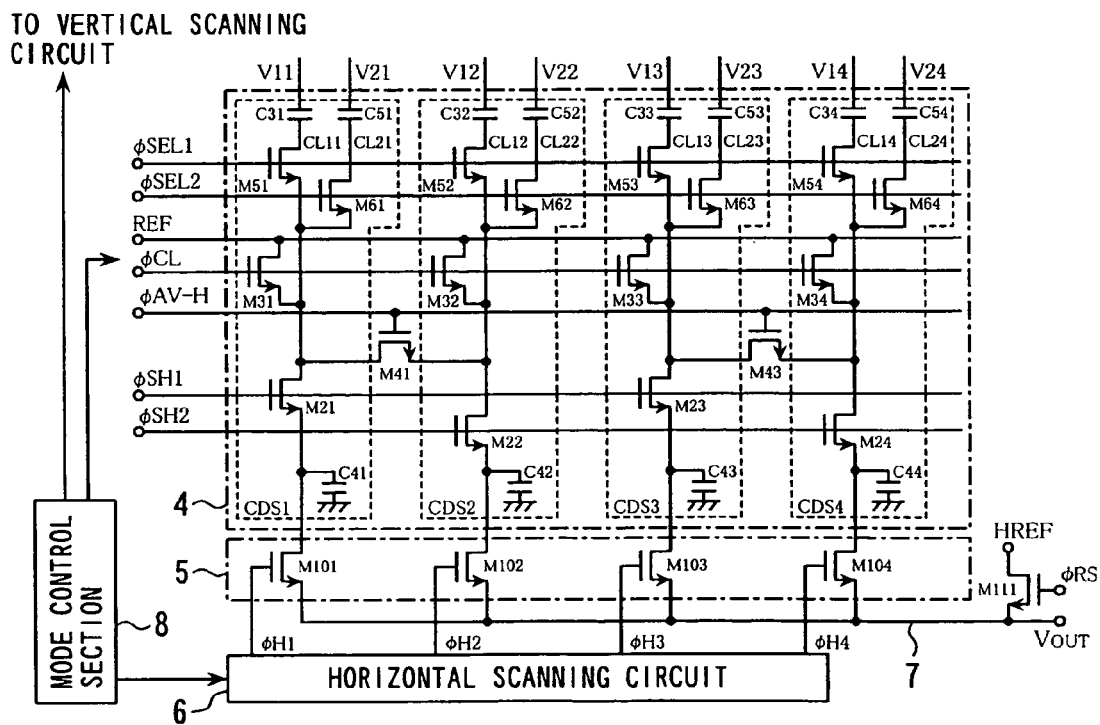
FIG. 15 is a circuit diagram showing construction of a main portion of solid-state imaging apparatus according to a fifth embodiment of the invention.

FIG. 15 is a circuit diagram showing construction of a main portion of a fifth embodiment of solid-state imaging apparatus using an amplified MOS sensor according to the invention. In this embodiment, the construction of the noise suppressing section 4 is changed as compared to the fourth embodiment shown in FIG. 12 so that the amplitude of mixed signals can be increased by accumulating the mixed signals only at the holding capacitors C41 and C43 of every other column. Its construction will now be described. It should be noted that construction of the pixel section etc., other than those shown in the figure is identical to that of the third embodiment shown in FIG. 9, and those components corresponding to the fourth embodiment shown in FIG. 12 are denoted by like reference numerals in FIG. 15.

At the noise suppressing section 4 of this embodiment, provided for each column is a noise suppressing circuit CDS1 to CDS4 which includes: vertical signal select transistors M51 to M54 and M61 to M64; a clamping transistor M31 to M34; a sampling transistor M21 to M24; clamping capacitors C31 to C34 and C51 to C54; and a holding capacitor C41 to C44. The noise suppressing section 4 is constructed by further providing: a horizontal mixing transistor M41 for connecting between the holding capacitors C41 and C42 through the sampling transistors M21 and M22 to be controlled respectively by a first and second sampling control lines φSH1 and φSH2; and a horizontal mixing transistor M43 for connecting between the holding capacitors C43 and C44 through the sampling transistors M23 and M24 to be controlled respectively by the first and second sampling control lines φSH1 and φSH2.

Figure 16:
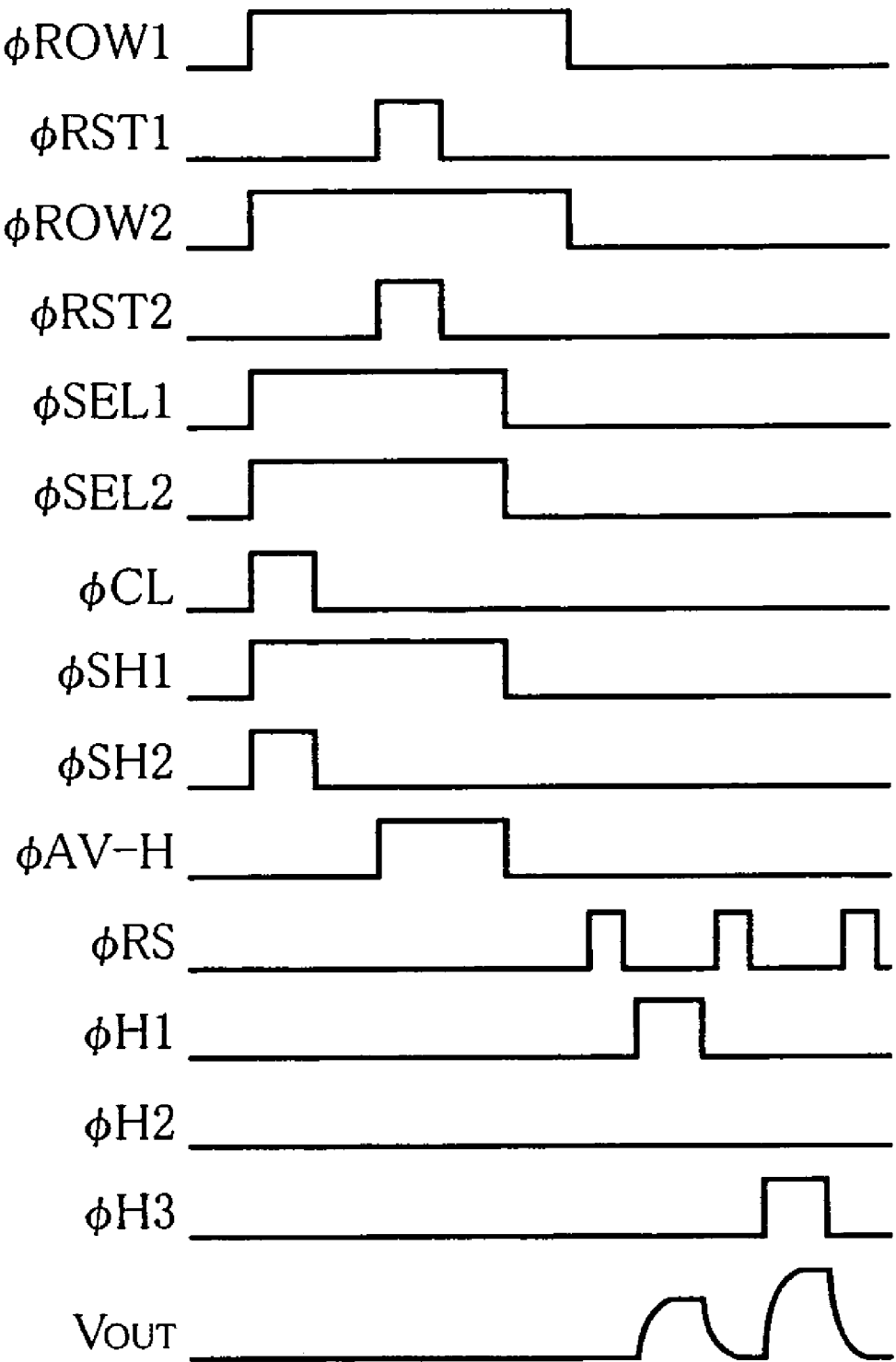
FIG. 16 is a drive timing chart for explaining operation at the time of vertical and horizontal mixing in the fifth embodiment shown in FIG. 15.

FIG. 16 is an outlined drive timing chart for explaining operation at the time of vertical and horizontal mixing in the present embodiment. Here, a description will be given below with noticing operation of the first and second columns from left when the upper first and second rows of the pixel section 1 are selected by the vertical scanning circuit 2. The drive timing at the time of vertical and horizontal mixing is set to the vertical scanning circuit 2, noise suppressing section 4 and horizontal scanning circuit 6 by the control signal of the mode control section 8. It should be noted that operation for accumulating difference voltages between the signal voltage of the respective vertical signal line and the reference voltage $V_{REF}$ at the clamping capacitors C31 and C51 as well as C32 and C52 in the condition where the power line VR1=VR2=H, and row select line φROW1=φROW2=H when the respective sampling control line φSH1=φSH2=H is identical to the third embodiment and a description thereof will be omitted.

Next, the clamp control line is φCL changed to φCL=L so as to bring the clamp output lines CL11 and CL21 as well as CL12 and CL22 into their high-impedance status. At this time, since the respective vertical signal select lines φSEL1, φSEL2 are φSEL1=φSEL2=H, the clamp output lines CL11 and CL21 as well as CL12 and CL22 are respectively connected through the vertical signal select transistors M51 and M61 as well as M52 and M62. Further, the horizontal mixing transistor M41 is turned ON by driving the horizontal mixing control line φAV–H to φAV–H=H to connect the clamp output lines CL11 and CL21 as well as CL12 and CL22. Here, at a timing before the driving to φAV–H=H, the holding capacitor C42 is disconnected by changing the second sampling control line φSH2 to φSH2=L so as to turn OFF the sampling transistor M22, whereby only the holding capacitor C41 is connected to the clamp output lines CL11 and CL21 as well as CL12 and CL22.

In this condition, by driving the row reset lines φRST1, φRST2 to φRST1=φRST2=H and then to φRST1=φRST2=L again, the reset voltages of photodiodes PD1 contained in the unit pixels P11 and P21 as well as P12 and P22 are outputted to the vertical signal lines V11 and V21 as well as V12 and V22 through the amplifying transistors M2. At this time, supposing the reset voltages on the vertical signal lines V11 and V21 as well as V12 and V22 respectively as $V_{V11\text{-}RST}$ and $V_{V21\text{-}RST}$ as well as $V_{V12\text{-}RST}$ and $V_{V22\text{-}RST}$ and supposing the difference voltages between the signal voltage of the vertical signal line V11 and V21 as well as V12 and V22, and the reset voltage as $\Delta V_{V11}$ and $\Delta V_{V21}$ as well as $\Delta V_{V12}$ and $\Delta V_{V22}$, the voltage change amount $\Delta V_{CL11}(=\Delta V_{CL21}=\Delta V_{CL12}=\Delta V_{CL22})$ of clamp output line and the clamp output line voltage $V_{CL11}$ ($=V_{CL21}=V_{CL12}=V_{CL22}$) after noise suppression are expressed as in the following formulas (23), (24) from a principle of conservation of electric charge.

$$\Delta V_{CL11}=[\{4C_{CL}/(4C_{CL}+C_{SH})\}\times(\Delta V_{V11}+\Delta V_{V21}+\Delta V_{V12}+\Delta V_{V22})/2] \quad (23)$$

$$\Delta V_{CL11}=V_{REF}+[\{4C_{CL}/(4C_{CL}+C_{SH})\}\times(\Delta V_{V11}+\Delta V_{V21}+\Delta V_{V12}+\Delta V_{V22})/2] \quad (24)$$

where the clamping capacitors C31, C51, C32 and C52 each have the same capacitance value $C_{CL}$, and the holding capacitors C41 has a capacitance value of $C_{SH}$.

Accordingly, at the same time of completion of the noise suppressing operation of the pixel signals of the unit pixels P1 and P21 as well as P12 and P22, the mixing operation of the pixel signals is also terminated. In addition, the output amplitude of mixed signal can be increased by accumulating the mixed signal only at the holding capacitor C41. Supposing $C_{CL}=C_{SH}$, the output amplitude $\Delta V_{CL11}$ of the mixed signal in the formula (23) becomes 1.2 times that in the case of formula (21) of the fourth embodiment.

Thereafter, the respective vertical signal select control lines φSEL1, φSEL2 are driven to φSEL1=φSEL2=L so that the vertical signal select transistors M51 and M61 are turned OFF to disconnect the clamp output lines CL11 and CL12, and the vertical signal select transistors M52 and M62 are similarly turned OFF to disconnect the clamp output lines CL12 and CL22. Further, the holding capacitor C41 is disconnected by driving the first sampling control line φSH1 to φSH1=L to turn OFF the sampling transistor M21. In addition, the noise suppressing circuits CDS1 and CDS2 are disconnected by driving the horizontal mixing control line φAV–H to φAV–H=L so as to turn OFF the horizontal mixing transistor M41. Furthermore, the unit pixels P11 and P21 as well as P12 and P22 are disconnected respectively from the vertical signal lines V11 and V21 as well as V12 and V22 by changing the row select lines φROW1, φROW2 to φROW1=φROW2=L. The reading of the pixel signals of the third and fourth columns is also similarly effected.

The readout of these mixed signals corresponding to two rows and two columns onto the output line 7 from the noise suppressing section 4 is effected by repeating the output line reset operation and signal read operation from the noise suppressing section 4 so as to read only the mixed signals accumulated at the holding capacitors C41 and C43 of every other column onto the output line 7 whereby the number of image data is reduced to ¼.

In the case where only the vertical mixing operation is to be effected in the present embodiment, the driving timing at the time of vertical mixing is set to the vertical scanning circuit 2, noise suppressing section 4, and horizontal scanning circuit 6 by the control signal of the mode control section 8. Thereafter, the noise suppression of the pixel signals is effected with keeping the horizontal mixing control line φAV–H to φAV–H=L at all times in FIG. 16. By then repeating the output line reset operation and signal read operation from the noise suppressing section 4 after the noise suppressing operation, all the mixed signals accumulated at the holding capacitors C41 to C44 are read out onto the output line 7. The number of image data is thereby reduced to half.

Figure 17:
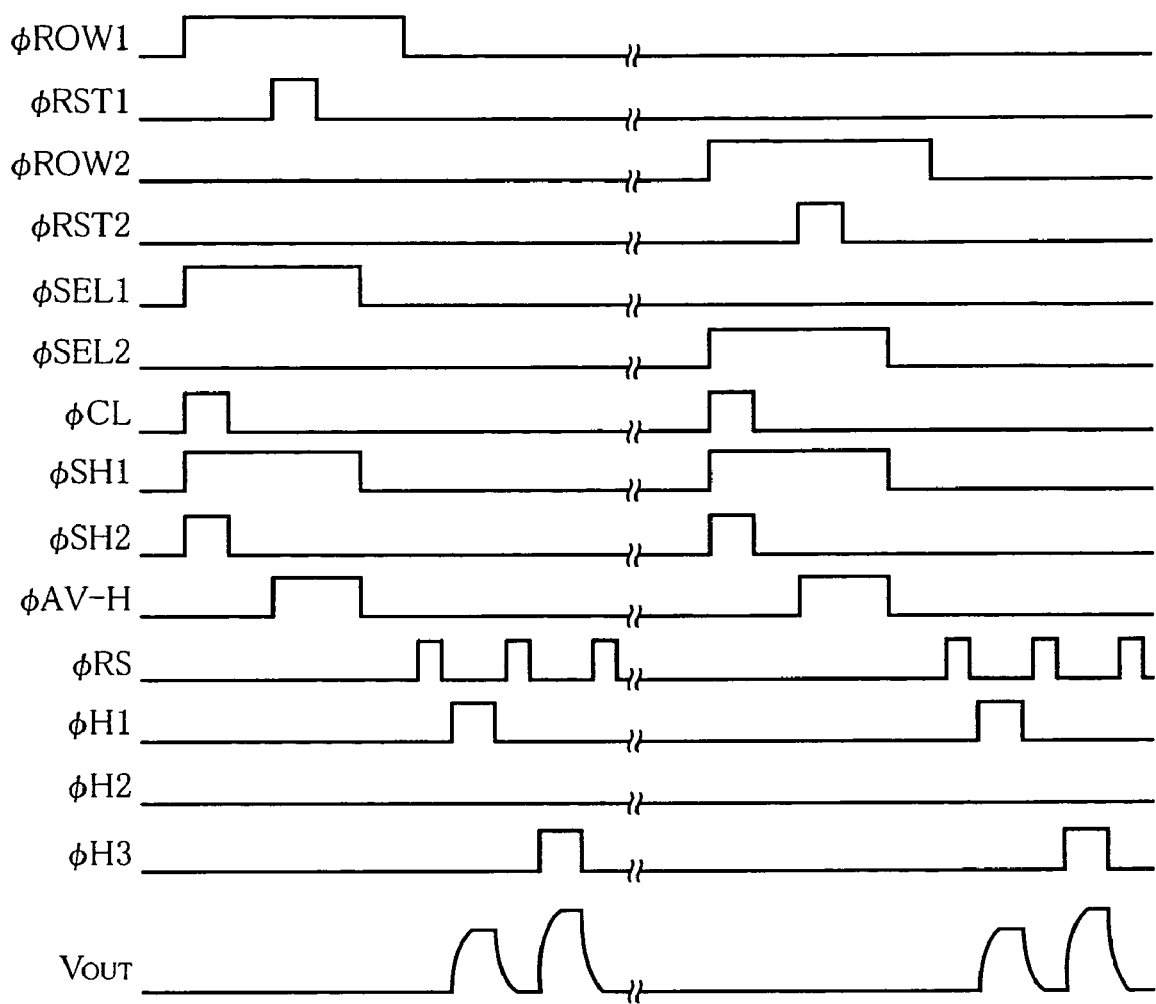
FIG. 17 is a drive timing chart for explaining operation at the time of operation only of horizontal mixing in the fifth embodiment shown in FIG. 15.

Further, in the case where only the horizontal mixing operation is to be effected in the present embodiment, the driving timing at the time of horizontal mixing is set to the vertical scanning circuit 2, noise suppressing section 4, and horizontal scanning circuit 6 by the control signal of the mode control section 8. Thereafter, the first and second vertical signal select control lines φSEL1 and φSEL2 are controlled as shown in FIG. 17 to effect noise suppression of the pixel signals row by row. By then repeating the output line reset operation and signal read operation after the noise suppressing operation, only the mixed signals accumulated at the holding capacitors C41 and C43 of every other column are read out onto the output line 7. The number of image data is thereby reduced to half.

Furthermore, when the vertical mixing and horizontal mixing are not effected in the present embodiment, the driving timing at the time of normal operation is set to the vertical scanning circuit 2, noise suppressing section 4 and horizontal scanning circuit 6 by the control signal of the mode control section 8. Thereafter, the noise suppressing operation of pixel signals is effected row by row with keeping the horizontal mixing control line φAV–H to φAV–H=L at all times in FIG. 17. Then, by repeating the output line reset operation and signal read operation after termination of the noise suppressing operation, all the individual signals accumulated at the holding capacitors C41 to C44 are read out onto the output line 7. The total number of image data is thereby obtained.

As the above, according to the present embodiment, noise suppression of pixel signals and mixing of the pixel signals corresponding to two rows can be concurrently effected by concurrently reading the pixel signals corresponding to two rows from the pixel section 1 by the control signal of the mode control section 8 and by driving the respective vertical signal select control lines φSEL1, φSEL2 to φSEL1=φSEL2=H at the time of the noise suppression so as to connect respectively between the clamp output lines CL11 and CL21, between CL12 and CL22, between CL13 and CL23, and between CL14 and CL24 within the same one column. In addition, mixing of pixel signals corresponding to two columns can be also concurrently effected by driving the horizontal mixing control line φAV–H to AV–H=H by the control signal of the mode control section 8 so as to respectively connect the holding capacitors C41 and C42 of the noise suppressing circuits CDS1 and CDS2 as well as the holding capacitors C43 and C44 of the noise suppressing circuits CDS3 and CDS4. As a result, the noise suppression of pixel signals and the mixing operation of the pixel signals corresponding to two rows and two columns can be concurrently effected.

Accordingly, pixel signals in the vertical direction can be mixed within a period for reading pixel signals corresponding to one row, and at the same time pixel signals in the horizontal direction can be mixed without requiring an extra processing time. In addition, by accumulating the vertically and horizontally mixed signals only at the holding capacitors C41 and C43 of every other column, the output amplitude of the mixed signals is increased as compared to the fourth embodiment so that deterioration of signal quality due to noise occurring at subsequent stage can be suppressed.

It should be noted that various modifications of the circuit construction and drive methods in the above described embodiments are possible without departing from the scope of the appended claims. For example, the driving of the horizontal mixing control line and that of the sampling control line may also be effected at the same timing at the time of horizontal mixing. Further, it is also possible to make the number of horizontally mixed pixels be of three or more columns or to make the number of vertically mixed pixels be of three or more rows. Furthermore, the invention can also be applied to a mixing operation between pixels that are not next to each other such as a horizontal mixing of n-th column and n+2-th column or mixing of m-th row and m+2-th row. Moreover, by modifying the circuit construction and drive method of the vertical scanning circuit and/or noise suppressing section, the invention can also be applied to cases where the constructional components of unit pixel and drive method are changed.

As has been described by way of the above embodiments, according to the first aspect of the invention, noise suppression of pixel signals and mixing of a plurality of the pixel signals can be concurrently effected by using the second mode where pixel signals after a parallel processing of noise suppression and signal mixing are outputted onto a horizontal signal line. It is thus possible to mix the pixel signals without requiring an extra processing time.

According to the second aspect of the invention, noise suppression of pixel signals and horizontal mixing of a plurality of the pixel signals can be concurrently effected by using the second mode so as to connect between capacitors provided column by column by means of a switch at the time of noise suppression. A mixing operation of the pixel signals in the horizontal direction is thus possible without requiring an extra processing time.

According to the third aspect of the invention, noise suppression of pixel signals and horizontal mixing of a plurality of the pixel signals can be concurrently effected by using the second mode so as to connect between a plurality of first capacitors by means of a second switch at the time of noise suppression. It is thus possible to mix the pixel signals in the horizontal direction without requiring an extra processing time. In addition, the number of connection of the first capacitors and second capacitors by the first switch is reduced so that the output amplitude of the mixed signals can be increased to reduce deterioration of signal quality due to noise occurring at subsequent stage.

According to the fourth aspect of the invention, noise suppression of pixel signals and mixing of the pixel signals of a plurality of rows can be concurrently effected by using the second mode. Accordingly, the pixel signals containing those in the vertical direction can be mixed in a period for reading the pixel signals corresponding to one row.

According to the fifth aspect of the invention, noise suppression of pixel signals and vertical mixing of the pixel signals corresponding to a plurality of rows can be concurrently effected by using the second mode so as to connect between first capacitors within the same one column by means of a first switch at the time of noise suppression. It is thus possible to mix the pixel signals in the vertical direction within a period for reading the pixel signals corresponding to one row.

According to the sixth aspect of the invention, noise suppression of pixel signals and vertical and horizontal mixing operation of the pixel signals corresponding to at least two rows and two columns can be concurrently effected by using the second mode so as to connect between first capacitors within the same one column by means of a first switch at the time of noise suppression and to connect the first capacitors located in different columns by means of a second switch. It is thus possible to mix the pixel signals in the vertical direction within a period for reading the pixel signals corresponding to one row and to mix the pixel signals in the horizontal direction without requiring an extra time.

According to the seventh aspect of the invention, noise suppression of pixel signals and vertical and horizontal mixing operation of the pixel signals corresponding to at least two rows and two columns can be concurrently effected by using the second mode so as to connect between a plurality of first capacitors within the same one column by means of a first switch at the time of noise suppression and to connect between the first capacitors of a plurality of columns by means of a third switch. It is thus possible to mix the pixel signals in the vertical direction within a period for reading the pixel signals corresponding to one row and to mix the pixel signals in the horizontal direction without requiring an extra time. In addition, by reducing the number of connection of the second capacitors by the third switch, the output amplitude of the mixed signals can be increased to reduce deterioration of signal quality due to noise occurring at subsequent stage.

What is claimed is:

1. A solid-state imaging apparatus including:
    a pixel section having unit pixels disposed two-dimensionally in rows and columns, each pixel containing a photoelectric conversion section and an amplifying section for amplifying output of the photoelectric conversion section to output a pixel signal;
    a vertical scanning section for selecting a row to be read out of the pixel section;
    a noise suppressing section having a noise suppressing function where a noise suppression of said pixel signal is effected unit pixel by unit pixel and a signal mixing function where a plurality of said pixel signal are mixed along a predetermined direction;
    a horizontal scanning section for causing said pixel signals along a horizontal direction processed through the noise suppressing section to be sequentially outputted from a horizontal signal line; and
    a mode control section for effecting a control in accordance with each mode of a first mode where pixel signals after said noise suppression are outputted onto said horizontal signal line and a second mode where pixel signals after a parallel processing combining said noise suppression and said signal mixing are outputted onto said horizontal signal line.

2. The solid-state imaging apparatus according to claim 1, wherein said noise suppressing section comprises capacitors provided respectively for each of said columns and a switch for connecting between at least two of said capacitors;
    wherein said mode control section in said second mode effects a control so as to apply on said capacitors a first output level of said pixel signals and without an interruption a second output level thereof in the condition where a plurality of said capacitors are connected through said switch.

3. The solid-state imaging apparatus according to claim 1, wherein said noise suppressing section comprises for each of said columns a first capacitor, a second capacitor, a first switch for connecting between said first capacitor and said second capacitor, and a second switch for connecting between a plurality of said first capacitor;
    wherein said mode control section in said second mode effects a control so as to apply on said second capacitor a first output level of said pixel signals and without an interruption a second output level thereof in the condition where N (N≧2) units of said first capacitor are connected through said second switch and M (M<N) units of said second capacitor are connected through said first switch.

4. The solid-state imaging apparatus according to claim 1, wherein said noise suppressing section comprises a plurality of first capacitors provided in parallel at each one of said columns in a manner respectively corresponding to a plurality of rows and a first switch for selectively connecting between a plurality of said first capacitor at each one of said columns;
    wherein said mode control section in said second mode effects a control so as to apply on said first capacitors a first output level of said pixel signals and without an interruption a second output level thereof in the condition where a plurality of said first capacitors of same one column selected by said first switch are connected to each other.

5. The solid-state imaging apparatus according to claim 4, wherein said pixel section has a plurality of signal lines in each one of said columns so that a plurality of pixels in same one column are connected to different ones of the signal lines by predetermined pixel units;
    wherein a plurality of said first capacitors are provided respectively for each signal line of said plurality of signal lines.

6. The solid-state imaging apparatus according to claim 4, wherein said noise suppressing section further comprises a second switch for connecting between a plurality of said first capacitors of different ones of said columns;
    wherein said mode control section in said second mode effects a control so as to apply on said first capacitor a first output level of said pixel signals and without an interruption a second output level thereof in the condition where a plurality of said first capacitors of the different ones of said columns are connected through said second switch.

7. The solid-state imaging apparatus according to claim 6, wherein said noise suppressing section further comprises a second capacitor and a third switch for connecting between said first capacitor and said second capacitor;
    wherein said mode control section in the second mode effects a control so as to apply on said second capacitor a first output level of said pixel signals and without an interruption a second output level thereof in the condition where N (N≧2) units of said first capacitor are connected through said second switch and M (M<N) units of said second capacitor are connected through said third switch.

* * * * *

UNITED STATES PATENT AND TRADEMARK OFFICE
CERTIFICATE OF CORRECTION

PATENT NO. : 7,598,992 B2 Page 1 of 1
APPLICATION NO. : 11/166190
DATED : October 6, 2009
INVENTOR(S) : Seisuke Matsuda It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1136 days.

Signed and Sealed this

Twenty-eighth Day of September, 2010

David J. Kappos
*Director of the United States Patent and Trademark Office*